(12) United States Patent
Popov et al.

(10) Patent No.: US 7,629,285 B2
(45) Date of Patent: *Dec. 8, 2009

(54) CARBON-BASED COMPOSITE ELECTROCATALYSTS FOR LOW TEMPERATURE FUEL CELLS

(75) Inventors: Branko N. Popov, Columbia, SC (US); Jog-Won Lee, Columbia, SC (US); Nalini P. Subramanian, Kennesaw, GA (US); Swaminatha P. Kumaraguru, Honeoye Falls, NY (US); Hector R. Colon-Mercado, Columbia, SC (US); Vijayadurga Nallathambi, T-Nagar (IN); Xuguang Li, Columbia, SC (US); Gang Wu, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 35 days.

This patent is subject to a terminal disclaimer.

(21) Appl. No.: 11/930,322

(22) Filed: Oct. 31, 2007

(65) Prior Publication Data

US 2008/0161183 A1 Jul. 3, 2008

Related U.S. Application Data

(60) Provisional application No. 60/855,505, filed on Oct. 31, 2006.

(51) Int. Cl.
*B01J 31/00* (2006.01)
*B01J 21/18* (2006.01)
*B01J 27/06* (2006.01)
*B01J 23/00* (2006.01)
*B01J 23/02* (2006.01)
*B01J 23/06* (2006.01)
*B01J 23/40* (2006.01)
*B01J 23/74* (2006.01)

(52) U.S. Cl. .............. 502/180; 502/150; 502/153; 502/173; 502/182; 502/185

(58) Field of Classification Search .............. 502/150, 502/153, 173, 180, 182, 185
See application file for complete search history.

(56) References Cited

U.S. PATENT DOCUMENTS

| 4,835,074 A | * | 5/1989 | Bolster et al. | 429/43 |
| 4,970,189 A | * | 11/1990 | Tachibana | 502/183 |
| 5,504,050 A | * | 4/1996 | Hayden | 502/180 |

OTHER PUBLICATIONS

Hillenbrand et al. "The Platinum-on-Carbon Catalyst System for Hydrogen Anodes", Journal of the Electrochemical Society, vol. 112, No. 3, pp. 245-249 (1965).
Ross et al. "The Valence Band Structure of Highly Dispersed Platinum", Journal of Catalysts, vol. 32, pp. 163-165 (1974).
Ehrburger et al., "Dispersion of Iron Phthalocyanine on Carbon Surfaces", Journal of Colloid and Interface Science, vol. 91, No. 1, pp. 151-159 (1983).
Jaouen et al. "Oxygen Reduction Catalysts for Polymer Electrolyte Fuel Cells from the Pyrolysis of Iron Acetate Adsorbed on Various Carbon Supports", Journal of Physical Chemistry B, vol. 107, No. 6, pp. 1376-1386 (2003).
Roy et al. "Direct Methanol Fuel Cell Cathodes with Sulfur and Nitrogen-Based Carbon Functionality", Journal of the Electrochemical Society, vol. 143, No. 10, pp. 3073-3079 (1996).
Wang et al. "Effect of the Pre-Treatment of Carbon Black Supports on the Activity of Fe-Based Electrocatalysts for the Reduction of Oxygen", Journal of Physical Chemistry, vol. 103, No. 12, pp. 2042-2049 (1999).
Brezina et al. "Study of Catalysts for Fuel Cell Exectrodes: Evaluation of Carbon Activity with Respect to Electrochemical Reduction of Oxygen and Decomposition of Hydrogen Peroxide", Collection Czechoslovakia Chemistry Communication, vol. 33, pp. 2363-2369 (1968).

(Continued)

*Primary Examiner*—Patricia L Hailey
(74) *Attorney, Agent, or Firm*—Dority & Manning, P.A.

(57) ABSTRACT

A process for synthesis of a catalyst is provided. The process includes providing a carbon precursor material, oxidizing the carbon precursor material whereby an oxygen functional group is introduced into the carbon precursor material, and adding a nitrogen functional group into the oxidized carbon precursor material.

25 Claims, 34 Drawing Sheets

OTHER PUBLICATIONS

H.P. Boehm, "Some Aspects of the Surface Chemistry of Carbon Blacks and Other Carbons", Carbon, vol. 32, No. 5, pp. 759-769 (1994).

Chen et al. "Acid/Base-Treated Activated Carbons: Characterization of Functional Groups and Metal Adsorptive Properties", Langmuir, vol. 20, No. 6, pp. 2233-2242 (2004).

Kinoshita et al. "Potentiodynamic Analysis of Surface Oxides on Carbon Blacks", Carbon, vol. 11, pp. 403-411 (1973).

Shim et al. "Effect of Modification with $HNO_3$ and NaOH on Metal Adsorption by Pitch-Based Activated Carbon Fibers", Carbon, vol. 39, pp. 1635-1642 (2001).

Carrasco-Marin et al. "Water Adsorption on Activated Carbons with Different Degrees of Oxidation", Journal of Chemical Society, Faraday Trans., vol. 93, No. 12, 2211-2215 (1997).

Garten et al. "The Quinone-Hydroquinone Character of Activated Carbon and Carbon Black" Australian Journal of Chemistry, vol. 8, pp. 68-95 (1953).

Radoslav Adzic, "Recent Advances in the Kinetics of Oxygen Reduction", Electrocatalysis, Editors J. Lipkowski, P.N. Ross, Wiley-VCH, Inc. (1998).

J.B. Donnet, "The Chemical Reactivity of Carbons", Carbon, vol. 6, pp. 161-176 (1968).

Jaouen et al. "Fe-Based Catalysts for Oxygen Reduction in PEMFCs: Importance of the Disordered Phase of the Carbon Support", Journal of the Electrochemical Society, vol. 153, No. 4, pp. A689-A698 (2006).

Yeager, "Electrocatalysts for $O_2$ Reduction", Electrochimica Acta, vol. 29, No. 11, pp. 1527-1537 (1984).

Wiesener, "$N_4$-Chelates as Electrocatalyst for Cathodic Oxygen Reduction", Electrochimica Acta, vol. 31, No. 8, pp. 1073-1078 (1986).

* cited by examiner

CARBON-BASED COMPOSITE ELECTROCATALYSTS FOR LOW TEMPERATURE FUEL CELLS

CROSS-REFERENCE TO RELATED APPLICATIONS

The present application is based on and claims priority to U.S. Provisional Application 60/855,505 having a filing date of Oct. 31, 2006, which is incorporated by reference herein.

GOVERNMENT SUPPORT CLAUSE

The present invention was developed under Grant DE-FC36-03GO13108 from the Department of Energy. The government retains certain rights in this invention.

BACKGROUND

Platinum is considered the best electrocatalyst for the four-electron reduction of oxygen to water in acidic environments because it provides the lowest overpotentials and the highest catalyst stability. However, even on pure Pt, potentials in excess of 300 mV are lost from the thermodynamic potential for oxygen reduction due to competing water activation and sluggish oxygen reduction kinetics. Furthermore, oxygen undergoes non-dissociative adsorption on Pt metals accompanied by some dissociative adsorption, which results in Pt oxidation. Importantly, Pt remains an expensive metal of low abundance.

There has been considerable research on non-precious metal catalysts such as: (i) porphyrin-based macrocyclic compounds of transition metals (e.g., cobalt phthalocyanines and iron tetramethoxyphenyl porphyrin (Fe-TMPP)), (ii) vacuum-deposited cobalt and iron compounds (e.g., Co—C—N and Fe—C—N), and (iii) metal carbides, nitrides and oxides (e.g., $FeC_x$, $TaO_xN_y$, $MnO_x/C$). Pyrolysis at higher temperatures than 800° C. in an inert or $NH_3$ atmosphere led to the improvement in catalytic activity of the catalysts to some extent, but none of the above catalysts are active enough to be used for oxygen reduction catalysts in low temperature fuel cells such as polymer electrolyte membrane fuel cells (PEMFCs) and direct methanol fuel cells (DMFCs).

There is disagreement in the literature regarding the catalytic reaction site for oxygen reduction and the relevant mechanism on non-precious metal catalysts. The most commonly accepted hypothesis is that the metal-$N_4$ center bound to the carbon support is catalytically active, and the central metal ion in the macrocycle plays a crucial role in the oxygen reduction reaction. It has been proposed that oxygen reduction on $N_4$-chelates of transition metal occurs via a modified "redox catalysis" mechanism. That is, an oxygen molecule is adsorbed on the catalyst metal center to form an oxygen-catalyst adduct, followed by electron transfer from the metal center and the regeneration of the reduced $N_4$-chelates. From the analysis of Fe-based catalysts by Time-of-Flight Secondary Ion Mass Spectrometry, Dodelet and his coworkers [J. Electrochem. Soc., 153, A689 (2006)] have maintained that two different catalytic sites, i.e., $FeN_4/C$ and $FeN_2/C$, coexist in the catalysts, irrespective of the Fe precursors used. Here, $FeN_4/C$ represents an Fe ion coordinated to four nitrogen atoms of the pyrrolic type, and $FeN_2/C$ stands for an Fe ion coordinated to two nitrogen atoms of the pyridinic type.

On the other hand, Yeager [Electrochim. Acta, 29, 1527 (1984)] and Wiesener [Electrochim. Acta, 31, 1073 (1986)] have suggested that the transition metals do not act as an active reaction site for oxygen reduction, but rather serve primarily to facilitate the stable incorporation of nitrogen into the graphitic carbon during high-temperature pyrolysis of metal-nitrogen complexes. This means that high-temperature pyrolysis in the presence of transition metals yields a carbonaceous layer with substantial nitrogen groups that are catalytically active for oxygen reduction.

Nitrogen-containing carbons have been typically prepared using implantation through $NH_3$ or HCN treatment of carbon at high temperatures. Another way to prepare carbons with a controlled nitrogen content is to synthesize carbon powder using nitrogen-containing polymer precursors, followed by physical or chemical activation process. The experimental measurements of nitrided Ketjen black indicated an onset potential for oxygen reduction of approximately 0.5 V(NHE) compared to that of 0.2 V(NHE) for untreated carbon. It is widely believed that the two electron transfer pathway is dominant on most of nitrogen-doped carbons, producing a large amount of $H_2O_2$, since the O—O bond breakage is not feasible.

As such, a need currently exists for a low-cost, easily manufactured carbon-based catalyst having high activity, selectivity, and stability for oxygen reduction.

SUMMARY

Objects and advantages of the disclosure will be set forth in part in the following description, or may be obvious from the description, or may be learned through the practice of the disclosure.

In general, the present disclosure is directed toward a novel carbon-based composite electrocatalyst and the methods of making the same.

In certain embodiments of the present disclosure, a process for synthesis of a catalyst is provided. The process includes providing a carbon precursor material, oxidizing the carbon precursor material whereby an oxygen functional group is introduced into the carbon precursor material, and adding a nitrogen functional group into the oxidized carbon precursor material.

In yet another embodiment of the present disclosure, a process for synthesis of a catalyst is provided. The process includes providing a carbon precursor material, oxidizing the carbon precursor material whereby an oxygen functional group is introduced into the carbon precursor material, adding a nitrogen functional group into the oxidized carbon precursor material to form an electrode support, and depositing a metal-nitrogen chelate onto the electrode support.

In certain embodiments, the present disclosure can also utilize the highly active carbon composite catalyst as a support for platinum-cobalt catalysts and low-platinum loading catalysts.

The catalyst of the present disclosure can be utilized as a cathode carbon composite electrocatalyst in low temperature fuel cells such as PEMFCs and DMFCs. Such a fuel cell could be utilized for various applications, including power sources for electric vehicles and portable devices. In electric vehicles, high power output and stability of fuel cells are of great importance, and the cathode catalyst of the present disclosure is advantageous in that regard.

Other features and aspects of the present disclosure are discussed in greater detail below.

DESCRIPTION OF THE DRAWINGS

A full and enabling disclosure, including the best mode thereof to one of ordinary skill in the art, is set forth more particularly in the remainder of the specification, including reference to the accompanying figures in which.

DETAILED DESCRIPTION

Figure 1:
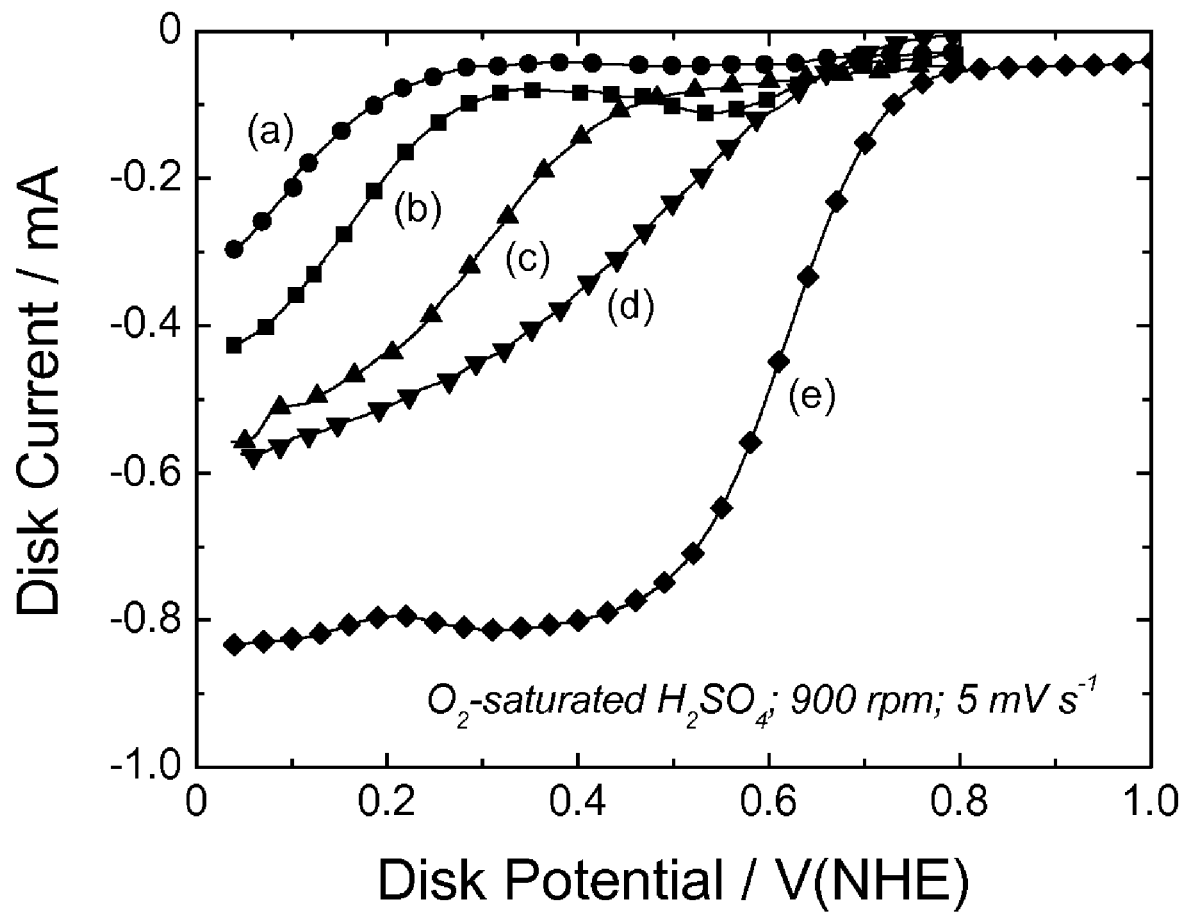
FIG. 1 illustrates catalytic activities of the metal-free catalysts: (a) as-received carbon black, (b) oxidized with $HNO_3$, (c) heat-treated in $NH_3$, (d) modified with ethylene diamine, (e) urea-formaldehyde/selenourea formaldehyde. The experiments were performed in 0.5 M $H_2SO_4$ solution saturated with $O_2$ using a potential scan rate of 5 mV s$^{-1}$ and a rotation speed of 900 rpm.

It is to be understood by one of ordinary skill in the art that the present discussion is a description of exemplary embodiments only, and is not intended as limiting the broader aspects of the present disclosure, which broader aspects are embodied in the exemplary construction.

The present disclosure is generally directed toward a novel carbon-based catalyst and the processes for making the same.

In accordance with certain aspects of the present disclosure, a novel process of synthesizing a metal-free catalyst is provided. In certain embodiments, the carbon precursor for the catalyst is carbon black. Suitable examples of carbon black available commercially are those sold under the trade names Vulcan XC-72 (available from Cabot Corp., Alpharetta, Ga.), Ketjen black EC 300 J (available from Lion Akzo Co., Ltd.), and Black Pearl 2000 (available from Cabot Corp., Alpharetta, Ga.). Although the present disclosure is generally disclosed with reference to carbon black, any other suitable carbon can be used for the metal-free catalyst. Although not required, the carbon is preferably washed with an acid to remove any metal impurities present in the carbon precursor prior to any reaction. For example, the carbon can be washed in an aqueous solution of hydrochloric acid (HCl). Then, the carbon precursor can be washed with distilled water to remove any acid residue (e.g., to remove any chloride residue).

As an initial step in the present disclosure, the carbon is oxidized to introduce oxygen functional groups into the carbon matrix. In certain embodiments, the carbon is oxidized with a solution of nitric acid (HNO$_3$). For example, the carbon can be immersed to an aqueous solution of nitric acid and refluxed for a period of time to allow for the desired rate of oxidation. The oxidation degree of the carbon can be controlled by the concentration of the nitric acid solution and the length of time the carbon is allowed to react within the solution. The nitric acid solution can be an aqueous solution having a concentration of up to about 90% by weight, such as from about 10% to about 80% by weight. In certain embodiments, the carbon can be refluxed within a solution containing nitric acid for less than about 10 hours, such as from about 2 to about 9 hours.

Although nitric acid is disclosed as the oxidizing agent, it is not intended to limit the present disclosure to the use of nitric acid. Of course, any other suitable oxidizing agent can be utilized within the present disclosure. Other examples of oxidizing agents that can be used in accordance with the present disclosure include, but are not limited to, sulfuric acid (H$_2$SO$_4$), phosphoric acid (H$_3$PO$_4$) and perchloric acid (HClO$_4$), and combinations thereof. Through oxidation of the carbon, oxygen functional groups are introduced on the surface of the carbon. For instance, the oxygen functional groups can include, without limitation, quinone, carboxyl, lactone, phenol, carbonyl, ether, pyrone, chromene groups, and combinations thereof, depending on the oxidizing agent used.

No matter the oxidizing agent utilized, nitrogen functional groups can be added to the oxidized carbon precursor. Nitrogen functional groups can be added via a polymerization process of nitrogen donor followed by high-temperature pyrolysis. For example, a nitrogen precursor can be polymerized to yield a formaldehyde-type compound. Suitable nitrogen precursors include, without limitation, melamine, urea, thio-urea, selenourea, and combinations thereof. The molar ratio of urea (or melamine):formaldehyde in the reaction mixture can be up to about 1:5, such as from about 1:1 to about 1:4. Upon polymerization, these nitrogen sources yield, respectfully, melamine formaldehyde, urea formaldehyde, thio-urea formaldehyde, and selenourea formaldehyde.

The polymerization can be accomplished by: (i) addition of an alkaline solution to increase the solution pH (e.g., in certain embodiments from about 10.0 to about 13.0) and (ii) addition of an acid solution (e.g., HCl, HNO$_3$, H$_2$SO$_4$, HClO$_4$, and H$_3$PO$_4$) to decrease the solution pH (in certain embodiments from about 3.0 to about 6.0). Suitable alkaline solutions include, but are not limited to, sodium hydroxide (NaOH), potassium hydroxide (KOH), and combinations of thereof. The acid solution can include hydrochloric acid, nitric acid, sulfuric acid, phosphoric acid, perchloric acid, and combinations of thereof.

The polymerized carbon-nitrogen precursor is then subjected to heat-treatment in an inert atmosphere at elevated temperatures in order to incorporate and stabilize the nitrogen functional groups in the carbon matrix. For instance, the elevated temperature can be greater than about 500° C., such as from about 600 to about 1000° C. The pyrolysis can last for at least about 1 hour. Of course, the temperature and length of pyrolysis can be varied to achieve desired results.

It should be understood by one skilled in the art that the activity, selectivity, and stability of the catalyst can be optimized as a function of the surface oxygen group, the nitrogen content, and the precursor. Likewise, the carbon support porosity, pore size, and pore distribution can affect the catalyst performance. Additionally, a non-metal additive (e.g., S, Se, Te, and the like) can be added to any of the above steps to vary the performance of the carbon precursor, and the resulting catalyst.

In accordance with another embodiment of the present disclosure, a process for synthesis of a carbon composite catalyst is described. In certain embodiments, the support for the composite catalyst is the metal-free catalyst described in the present disclosure. Although the present disclosure is generally disclosed with reference to the metal-free carbon support, any other suitable carbon can be used for the carbon composite catalyst.

The metal-free carbon support is combined with a non-Pt metal to form the carbon composite catalyst. Specific nitrogen precursors that could be used to form the carbon composite catalyst include, but are not limited to, cobalt (Co), iron (Fe), chromium (Cr), copper (Cu), nickel (Ni), vanadium (V), and combinations thereof. Typically, the metal precursor is combined with a nitrogen precursor to form a chelate. For instance, cobalt hexahydrate and iron sulfate heptahydrate are dissolved in a solvent containing the metal-free carbon precursor. A nitrogen precursor is then added to the solution. Specific nitrogen precursors that could be used to form the metal-nitrogen chelate include, but are not limited to ethylene diamine, propylene diamine, and combinations thereof or any other nitrogen containing organic containing compounds). The metal to nitrogen (atomic) ratio can be up to about 1:30, such as from about 1:1 to about 1:20.

In certain embodiments, the metal-nitrogen chelate can have a structure with the formula $MN_4$, wherein M is the metal and N is the nitrogen atom chelated with M, though the nitrogen is bonded to another molecule. For example, the metal-nitrogen chelate can be cobalt ethylene diamine. Cobalt ethylene diamine can be prepared by adding stoichiometric amounts of ethylene diamine to cobalt nitrate under stirring conditions in a solvent (e.g., ethanol). Alternatively, the metal-nitrogen chelate can be cobalt propylene diamine. Again, though these metal precursors are disclosed with reference to cobalt, any other suitable non-Pt transitional metal may be used.

No matter the metal precursor composition, the metal precursor can be included within a solution such that the metal concentration is up to about 60% by weight, such as from about 1 to about 50% by weight. In certain embodiments, for instance, the metal can be in a concentration of from about 20 to about 40% by weight.

To deposit the metal-nitrogen chelate onto the oxidized carbon, the metal-nitrogen and the oxidized carbon can be combined in a solution and refluxed for a period of time (e.g., at least about an hour). For example, in certain embodiments, the metal-free carbon support can be refluxed within a solution containing metal and nitrogen precursors for at least 1 hour. The solvent for the reflux solution can be any suitable solvent, such as an alcohol (e.g., ethanol, propanol, methanol, isopropanol, butanol, etc.), an ether, and the like.

Once refluxed, the solution can be pyrolized at elevated temperatures in an inert atmosphere. For example, the solution can be pyrolized at a temperature of greater than about 500° C., such as from about 600 to about 1000° C. The inert atmosphere can be formed from nitrogen gas, helium gas, argon gas, and the like. If desired, any free metal on the carbon surface can be washed off by dissolving them in an acidic solution, such as hydrochloric acid and sulfuric acid. Then, the metal-carbon solution may be pyrolized again.

In certain embodiments, the present disclosure can utilize the highly active carbon composite catalyst as a support for platinum-cobalt catalysts. The carbon composite catalyst and platinum precursor can be combined in a solution. For instance, stoichiometric amounts of hexachloroplatinic acid ($H_2PtCl_6$) and hydrochloric acid were mixed with de-ionized water containing the carbon composite support. A reducing agent can be then added to the reaction mixture, followed by refluxing at elevated temperatures. Suitable reducing agents include, without limitation, sodium formate, sodium hypophosphite, hydrazine, dimethyl amine borane, and sodium borohydride. The resulting platinum-cobalt catalyst can be rinsed with de-ionized water, and then dried under vacuum. The sample can be heat-treated in an inert atmosphere at high temperatures. For example, the sample can be pyrolized at a temperature of greater than about 500° C., such as from about 600 to about 1000° C.

In certain embodiments, the present disclosure can utilize the highly active carbon composite catalyst as a support for low platinum loading catalysts. The platinum loading on the fuel cell cathode can be reduced to the levels that are lower than 0.01 mg cm$^{-2}$.

The following Examples are intended to be purely exemplary of the present disclosure. In the Examples given below, experimental data are presented which show some of the results that have been obtained from embodiments of the present disclosure for different materials, temperatures, and processes.

EXAMPLES

A. Carbon-Based Metal-Free Catalysts

A-1. Catalyst Preparation

Commercially available carbon black, Ketjen Black EC-300 J, was pre-washed with 6 M HCl to dematerialize the carbon of any metal impurities. Next, the carbon was washed in distilled water to remove any chloride impurities. To form nitric acid oxidized carbon, the carbon substrate oxidation was carried out in 70% $HNO_3$ for 7 h under reflux and washing in distilled water followed by drying in oven at 75° C. The oxidized carbon was refluxed in ethanol with ethylene diamine for 4 h at 80° C. and then dried using a rotary evaporator at 80° C. under vacuum. The sample was then heat-treated in an Ar atmosphere at 800° C. for 1 h.

Alternatively, the nitrogen functional groups were introduced from the polymeric resins such as melamine-formaldehyde and urea-formaldehyde. The resins were synthesized by the addition-condensation reactions. Firstly, melamine/urea and formaldehyde were mixed in aqueous media in the molar ratio 1:3/1:2. NaOH was added to this mixture to bring the pH to 11-12 at 60° C., which initiates the addition reaction to form methylolurea/methylolmelamine intermediates. Then the pH was adjusted to around 4-5 using $H_2SO_4$ to initiate the condensation/polymerization reaction resulting in the respective resins. The sample was dried using a rotary evaporator at 80° C. under vacuum, and heat-treated in an Ar atmosphere at 800° C. for 1 h.

A-2. Rotating Ring-Disk Electrode (RRDE) Measurements

The RRDE experiments were performed in a three-electrode electrochemical cell using a bi-potentiostat (Pine Instruments) at room temperature. An RRDE with gold ring (5.52 mm inner-diameter and 7.16 mm outer-diameter) and glassy carbon disk (5.0 mm diameter) was employed as the working electrode. The catalyst ink was prepared by blending the catalyst powder (8 mg) with isopropyl alcohol (1 mL) in an ultrasonic bath. The catalyst ink (15 μL) was deposited onto the glassy carbon disk that had been polished with $Al_2O_3$ powder. After drying, 5 μL of a mixture of Nafion™ solution (5 wt %, Alfa Aesar) and isopropyl alcohol was coated onto the catalyst layer to ensure better adhesion of the catalyst on the glassy carbon substrate. The electrolyte was 0.5 M $H_2SO_4$ solution. A platinum mesh and an $Hg/HgSO_4$ electrode were used as the counter and reference electrodes, respectively.

In order to estimate the double layer capacitance, the electrolyte was deaerated by bubbling with $N_2$, and the cyclic voltammogram was recorded at 900 rpm by scanning the disk potential between 0.04 and 1.04 V vs. NHE at a rate of 5 mV s$^{-1}$. Then, the voltammogram was evaluated in the oxygen-saturated electrolyte. The oxygen reduction current was taken as the difference between currents measured in the deaerated and oxygen-saturated electrolytes. The ring potential was held at 1.2 V vs. NHE to oxidize $H_2O_2$ generated during the oxygen reduction reaction.

A-3. Performance Test of Membrane-Electrode Assemblies (MEAs)

The cathode catalyst ink was prepared by ultrasonically blending the catalyst powder with Nafion™ solution (5 wt %) and isopropyl alcohol for 2 h. The catalyst ink was sprayed onto a gas diffusion layer (GDL) (ELAT LT 1400W, E-TEK) until a desired catalyst loading has been achieved. A commercially available catalyzed GDL (LT140EW Low Temperature ELAT® GDE Microporous Layer, E-TEK) was used as the anode for all fuel cell tests. The anode catalyst is 30 wt % Pt/C and the Pt loading is 0.5 mg cm$^{-2}$. A thin layer of Nafion™ (0.4 mg cm$^{-2}$) was coated on both the anode and cathode surfaces. The Nafion™-coated anode and cathode were hot-pressed to a Nafion™ 112 membrane at 140° C. and at 15 atm for 3 min. The geometric area of the MEA used was 5 cm$^2$.

The MEA tests were carried out in a single cell with serpentine flow channels. Pure H$_2$ gas humidified at 77° C. and pure O$_2$ gas humidified at 75° C. were supplied to the anode and cathode compartments, respectively. Polarization experiments were conducted with a fully automated test station (Fuel Cell Technologies Inc.) at 75° C.

A-4. Catalytic Activity and Selectivity for Four-Electron Oxygen Reduction in Acidic Media FIG. 1 presents polarization curves observed on the rotating disk electrodes for various metal-free catalysts obtained in 0.5 M H$_2$SO$_4$ solution. For comparison, the curve measured on the as-received Ketjen black is also shown in FIG. 1. The as-received carbon (curve "a") does not show any catalytic activity towards oxygen reduction. The carbon oxidized with HNO$_3$ (curve "b") exhibits higher catalytic activity compared with the as-received carbon. The increased activity is attributed to the oxygen functional groups of quinine/hydroquinone generated on the carbon surface during HNO$_3$ treatment. Remarkable increase in the catalytic activity towards oxygen reduction has been achieved with the introduction of nitrogen groups. The metal-free catalysts synthesized by using ethylene diamine (curve "d") and urea-formaldehyde/selenourea formaldehyde (curve "e") show improved performance when compared with the conventional NH$_3$-treated carbon (curve "c"). The optimized metal-free catalyst (curve "e") exhibits an onset potential for oxygen reduction as high as 0.8 V vs. SHE and also a well-defined diffusion limiting current which is only observed in Pt-based catalyst.

Figure 2:
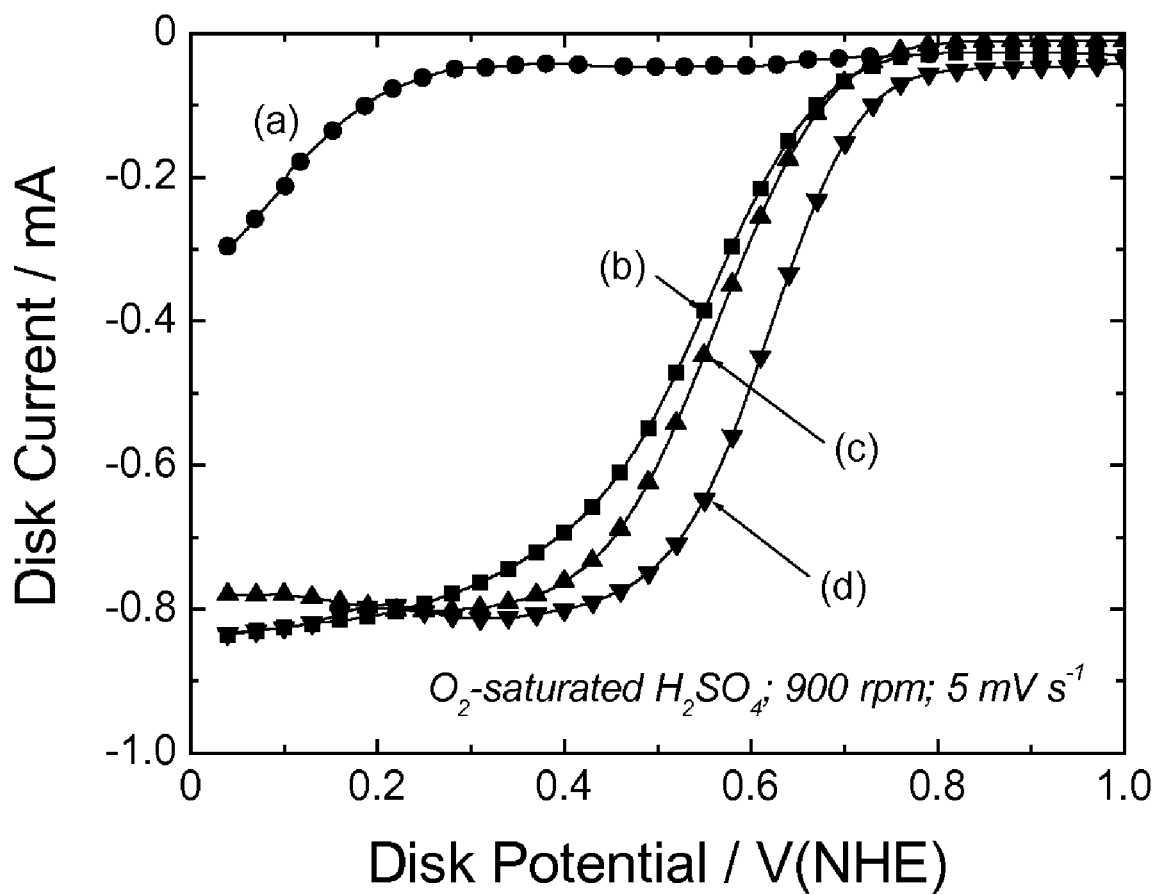
FIG. 2 illustrates catalytic activities of the metal-free catalysts: (a) as-received carbon black, (b) modified with urea-formaldehyde, (c) modified with selenourea-formaldehyde, (d) modified with urea-formaldehyde/selenourea-formaldehyde. The experiments were performed in 0.5 M $H_2SO_4$ solution saturated with $O_2$ using a potential scan rate of 5 mV s$^{-1}$ and a rotation speed of 900 rpm.

FIG. 2 gives polarization curves on the rotating disk electrodes for the catalysts synthesized using different types of polymeric resins: urea-formaldehyde, selenourea-formaldehyde and urea-formaldehyde/selenourea-formaldehyde (i.e., double-polymerization process). FIG. 2 indicates that the nature of nitrogen donor plays a critical role in the activity of metal-free catalysts, even though the synthesis methodology used is almost the same for all catalysts. The optimized catalyst (curve "d") shows an increase in the catalytic activity for oxygen reduction by about 500 mV, as compared with the as-received carbon.

Figure 3:
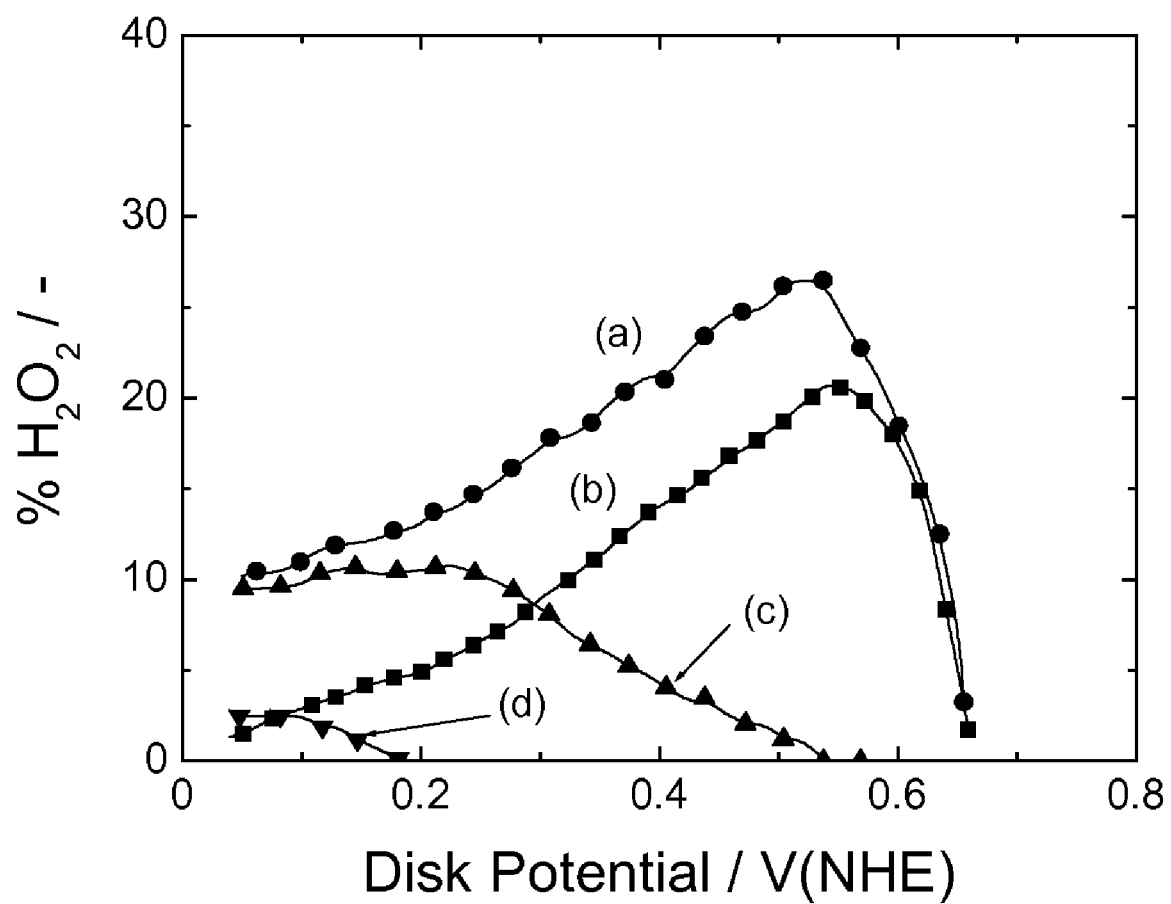
FIG. 3 illustrates catalytic selectivities (% $H_2O_2$) of the metal-free catalysts synthesized using different precursors: (a) melamine-formaldehyde, (b) thiourea-formaldehyde, (c) urea-formaldehyde, (d) selenourea-formaldehyde. The experiments were performed in 0.5 M $H_2SO_4$ solution saturated with $O_2$ using a potential scan rate of 5 mV s$^{-1}$ and a rotation speed of 900 rpm.
Figure 4:
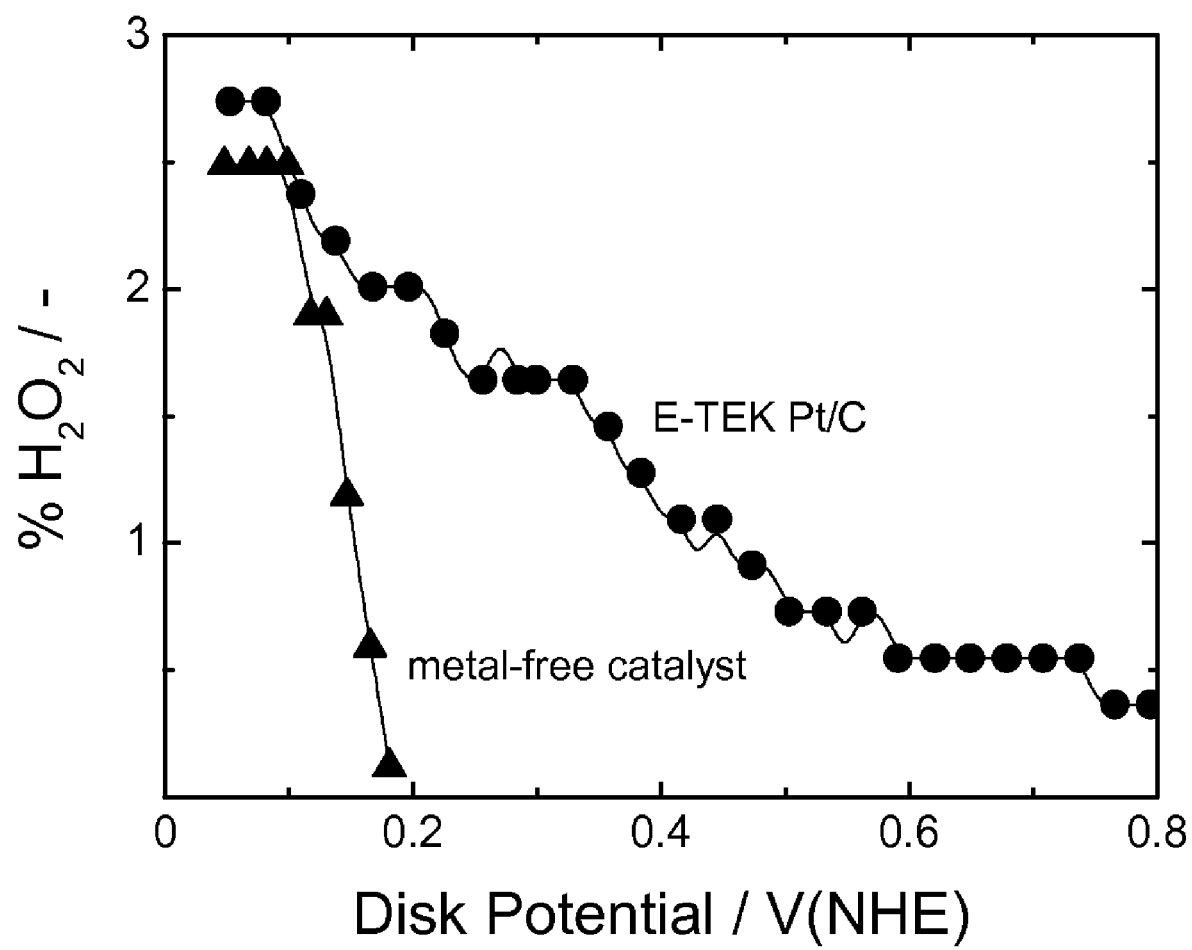
FIG. 4 illustrates comparison of selectivity between metal-free catalyst in accordance with certain embodiments of the present disclosure (synthesized using selenourea-formaldehyde) and Pt catalyst. The experiments were performed in 0.5 M $H_2SO_4$ solution saturated with $O_2$ using a potential scan rate of 5 mV s$^{-1}$ and a rotation speed of 900 rpm.

FIG. 3 compares the amounts of H$_2$O$_2$ produced on the metal-free catalysts synthesized using different nitrogen precursors: melamine-formaldehyde, thiourea-formaldehyde, urea-formaldehyde, and selenourea-formaldehyde. It is generally known that a carbonaceous material catalyzes oxygen reduction to H$_2$O$_2$ via two electron pathway; however, the optimized metal-free catalyst (curve "d") catalyzes oxygen reduction to water via four-electron pathway with producing no H$_2$O$_2$ at 0.5 V vs. SHE. Notice that Pt catalyst generates 1 to 2% H$_2$O$_2$ (FIG. 4).

Figure 5:
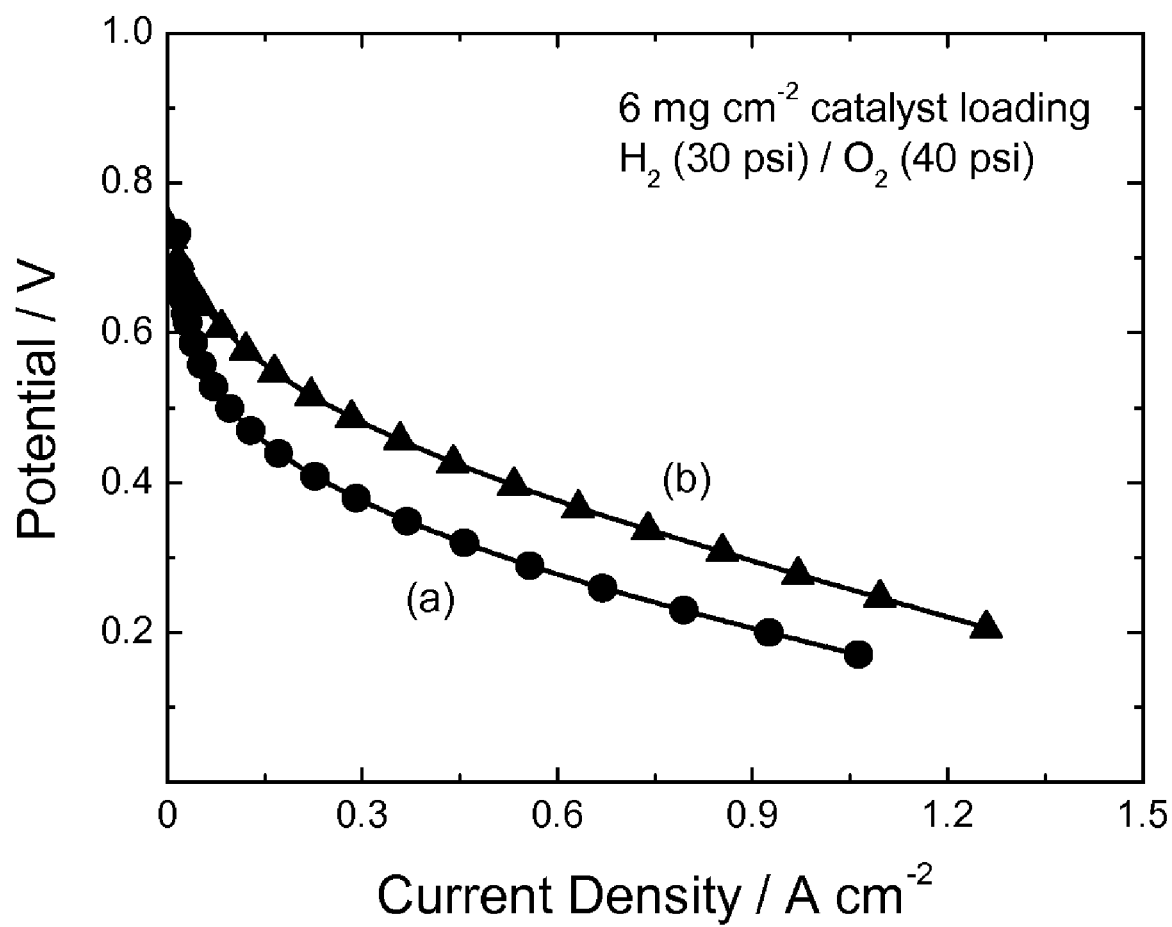
FIG. 5 illustrates fuel cell performances of the metal-free catalysts synthesized through (a) polymerization of urea-formaldehyde resin and (b) electroless deposition of tellurium (Te) on the oxidized carbon. The experiments were performed under the following conditions: (i) cathode catalyst loading=6 mg cm$^{-2}$, (ii) $H_2$ back pressure=30 psi, (iii) $O_2$ back pressure=40 psi, and (iv) cell temperature=75° C.

A-5. Performance and Stability of Carbon-Based Metal-Free Catalysts in PEM Fuel Cell FIG. 5 presents the fuel cell performances of the metal-free catalysts synthesized through polymerization of urea-formaldehyde resin and electroless deposition of tellurium (Te) on the oxidized carbon. The tellurium-modified metal-free catalyst was synthesized as follows: a desired amount of telluric acid (H$_2$TeO$_4$·H$_2$O, 99.99%, Alfa Aesar) was dissolved in deionized water, followed by the addition of the carbon black under stirring conditions. A reducing agent, hydrazine monohydrate (N$_2$H$_4$·H$_2$O, Aldrich), was added into the solution. The reaction mixture was refluxed at 85° C. for 12 h and then dried in a rotary evaporator at 90° C. under vacuum. The dried powder sample was heat-treated at 1000° C. in an argon atmosphere for 1 h.

The fuel cell tests were run using H$_2$ and O$_2$ under the following conditions: (i) cathode catalyst loading=6 mg cm$^{-2}$, (ii) anode Pt catalyst loading=0.4 mg cm$^{-2}$, (iii) cell temperature=75° C., (iv) back pressure=30 psi (anode) and 40 psi (cathode). No IR compensation was made during measurement. For the tellurium-modified metal-free catalyst, the current densities were determined to be 0.53 A cm$^{-2}$ at 0.4 V and 1.3 A cm$^{-2}$ at 0.2 V.

Figure 6:
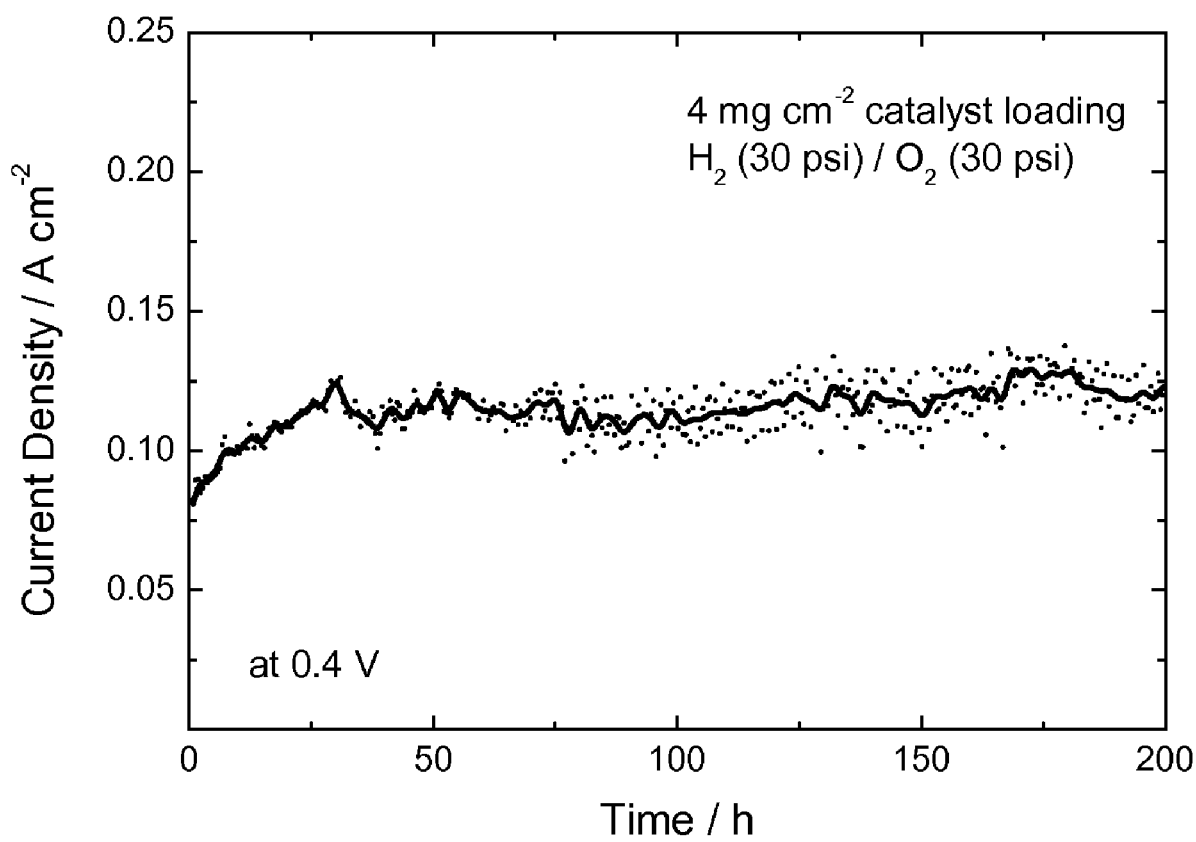
FIG. 6 illustrates current transient measured on the metal-free catalyst synthesized with urea-formaldehyde resin. The experiments were performed under the following conditions: (i) cathode catalyst loading=4 mg cm$^{-2}$, (ii) $H_2$ back pressure=30 psi, (iii) $O_2$ back pressure=30 psi, and (iv) cell temperature=75° C.

FIG. 6 shows the current transient measured on the metal-free catalyst synthesized with urea-formaldehyde resin. The tests were run using H$_2$ and O$_2$ under the following conditions: (i) cathode catalyst loading=4 mg cm$^{-2}$, (ii) anode Pt catalyst loading=0.4 mg cm$^{-2}$, (iii) cell temperature=75° C., (iv) back pressure=30 psi (anode) and 30 psi (cathode), (v) applied potential=0.4 V. The result shows an initial increase of current density to ca. 0.12 A cm$^{-2}$ and then a steady-state current profile without showing performance degradation up to 200 h. As described in the section A-4, the metal-free catalyst catalyzes oxygen reduction to water via four-electron pathway (no H$_2$O$_2$ at 0.5 V vs. SHE), which contributes to a long-term stability of PEM fuel cell.

Figure 7A:
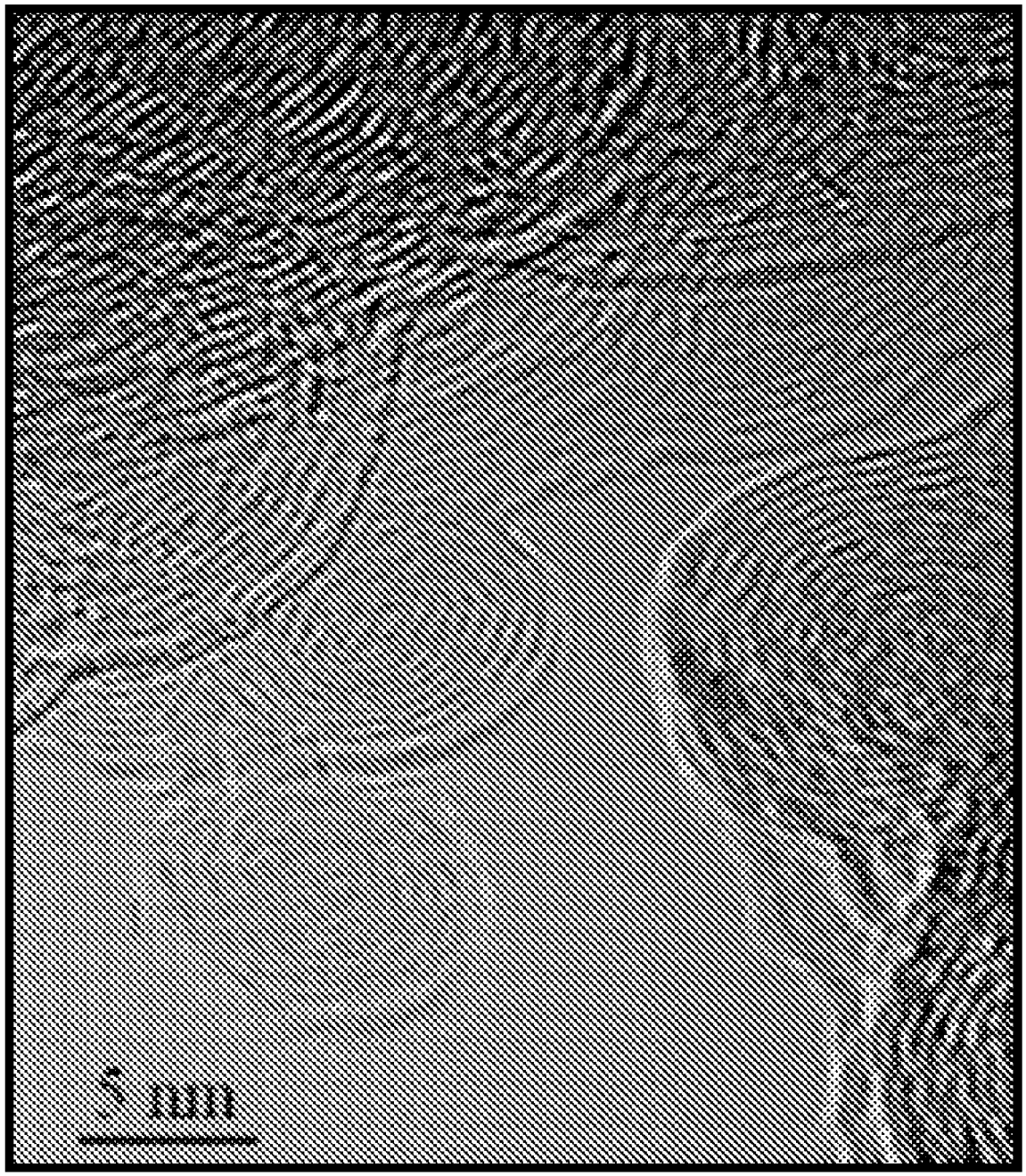
FIG. 7 illustrates (a) transmission electron microscopy (TEM) image and (b) X-ray diffraction (XRD) pattern of the metal-free catalyst (a–urea-formaldehyde, b–selenourea-formaldehyde)
Figure 7B:
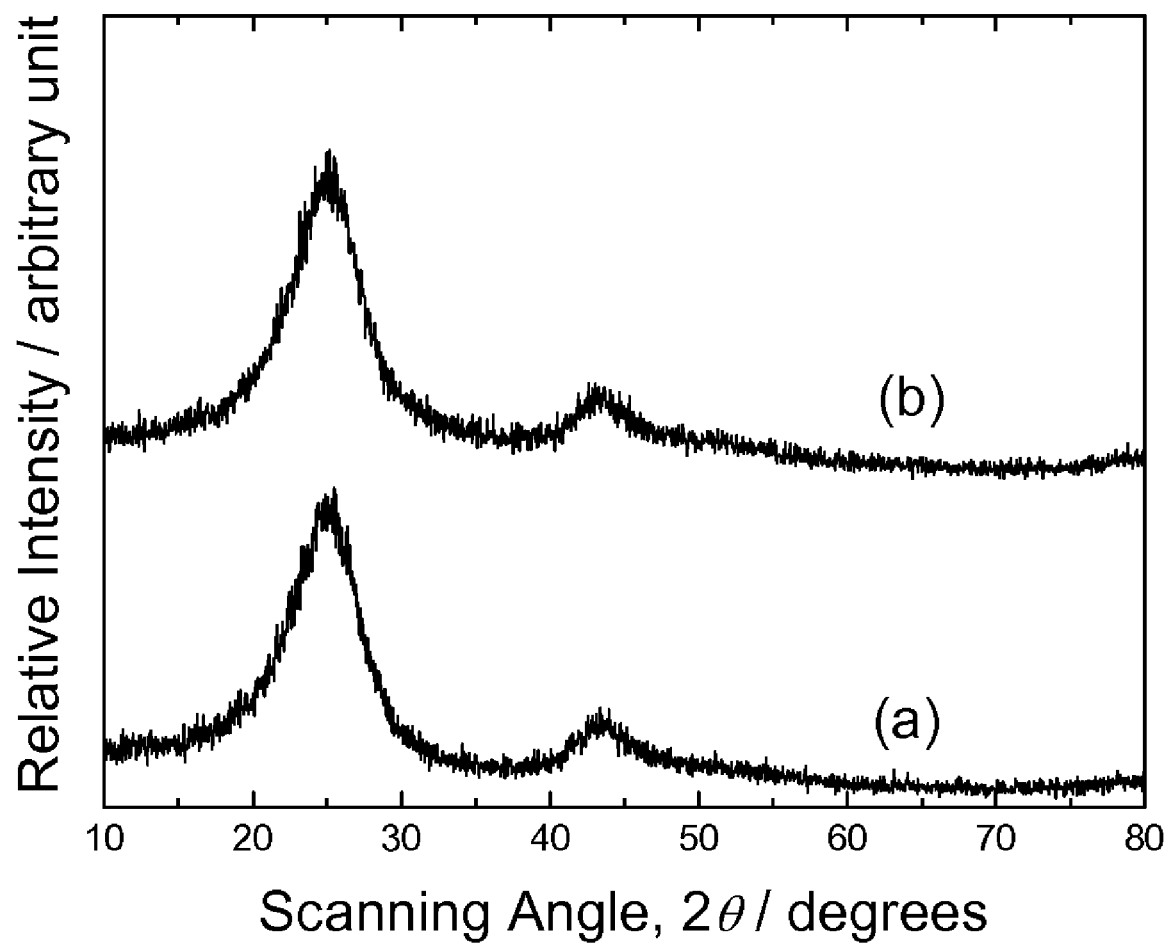

A-6. Characterizations of Catalytic Active Sites for the Oxygen Reduction Reaction FIGS. 7(a) and (b) demonstrate the transmission electron microscopy (TEM) image and X-ray diffraction (XRD) pattern of the metal-free catalyst. No metal particles are shown in the TEM image and only diffraction peaks from the carbon are observed in the XRD data, which indicates that only carboneous materials with surface functional groups are responsible for the catalytic activity towards oxygen reduction.

Figure 8:
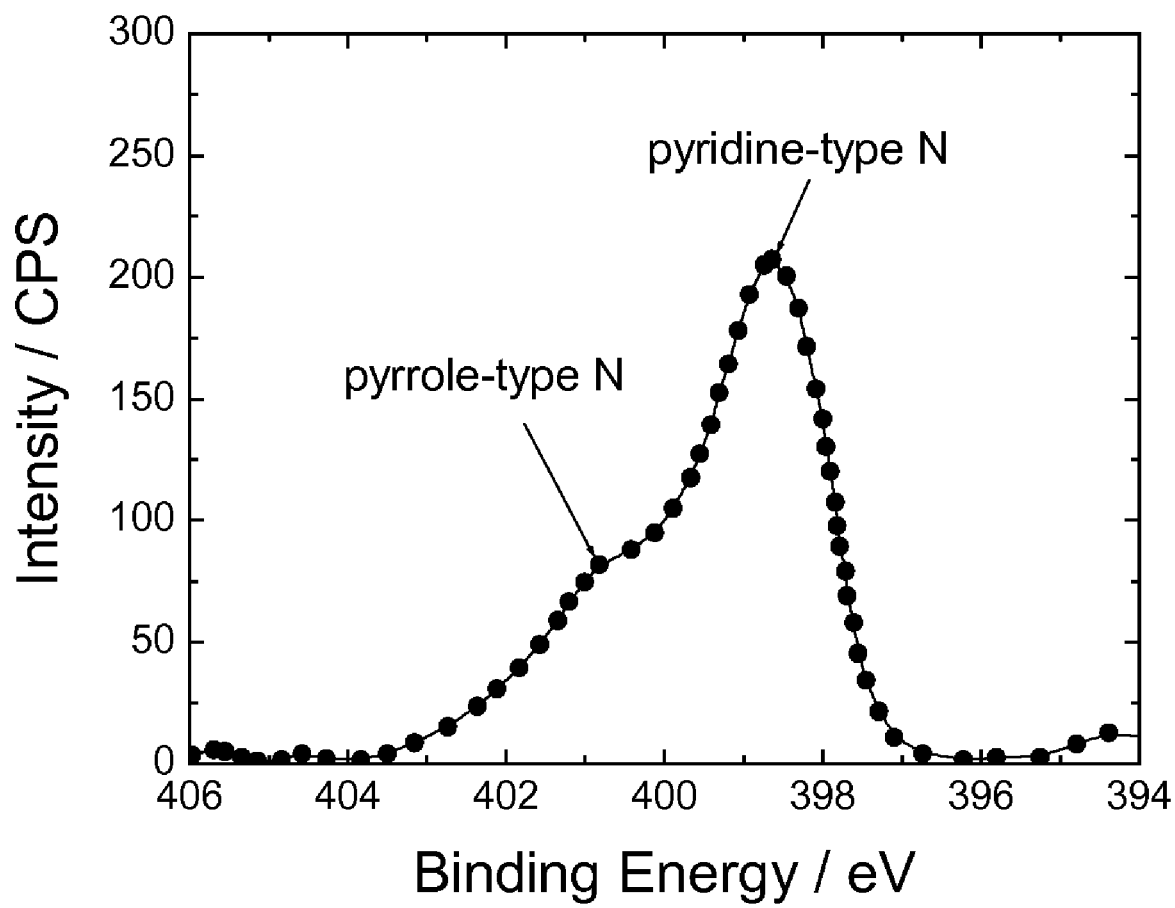
FIG. 8 illustrates X-ray photoelectron spectra of N 1s for the metal free catalyst synthesized using urea-formaldehyde.

The nature of nitrogen functional groups were identified using X-ray photoelectron spectroscopy (XPS), as shown in FIG. 8. The XPS data indicates that the polymerization process of urea-formaldehyde on the carbon surface followed by high-temperature pyrolysis results in the formation of pyridinic and pyrrolic nitrogen functional groups. The pyridinic nitrogen possesses one pair of electrons in addition to the one electron donated to the conjugated π bond. A strong π electron delocalization occurs due to formation of the pyridinic groups on the carbon surface at 800° C. The strong basicity of N-doped carbons facilitates reductive O$_2$ adsorption without the irreversible formation of oxygen functionalities.

B. Carbon Composite Catalysts

B-1. Catalyst Preparation

The carbon composite catalyst was synthesized using the metal-free carbon catalyst as a support through the three consecutive steps: (i) the deposition of Co—N, Fe—N or Co—Fe—N chelate complex on the support, and (ii) the high-temperature pyrolysis, and (iii) the chemical post-treatment. Co(NO$_3$)$_2$, FeSO$_4$, and ethylene diamine were used as Co-, Fe- and N-precursors, respectively. The metal precursors were dissolved in ethanol. A mixture of ethylene diamine and ethanol was added drop-wise into the reaction mixture, followed by vigorous stirring for 1 h. The metal-free carbon support was added into the reaction mixture and refluxed at 85° C. for 4 h. The solvents were removed in a rotary evaporator at 80° C. under vacuum, and the resulting power specimen was heat-treated in an argon atmosphere at different temperatures of 600-900° C. for 1 h. In order to remove excess metal elements deposited on the support, the pyrolized sample was treated with 0.5 M $H_2SO_4$ solution at 90° C. for 4 h, and washed thoroughly with deionized water.

Figure 9:
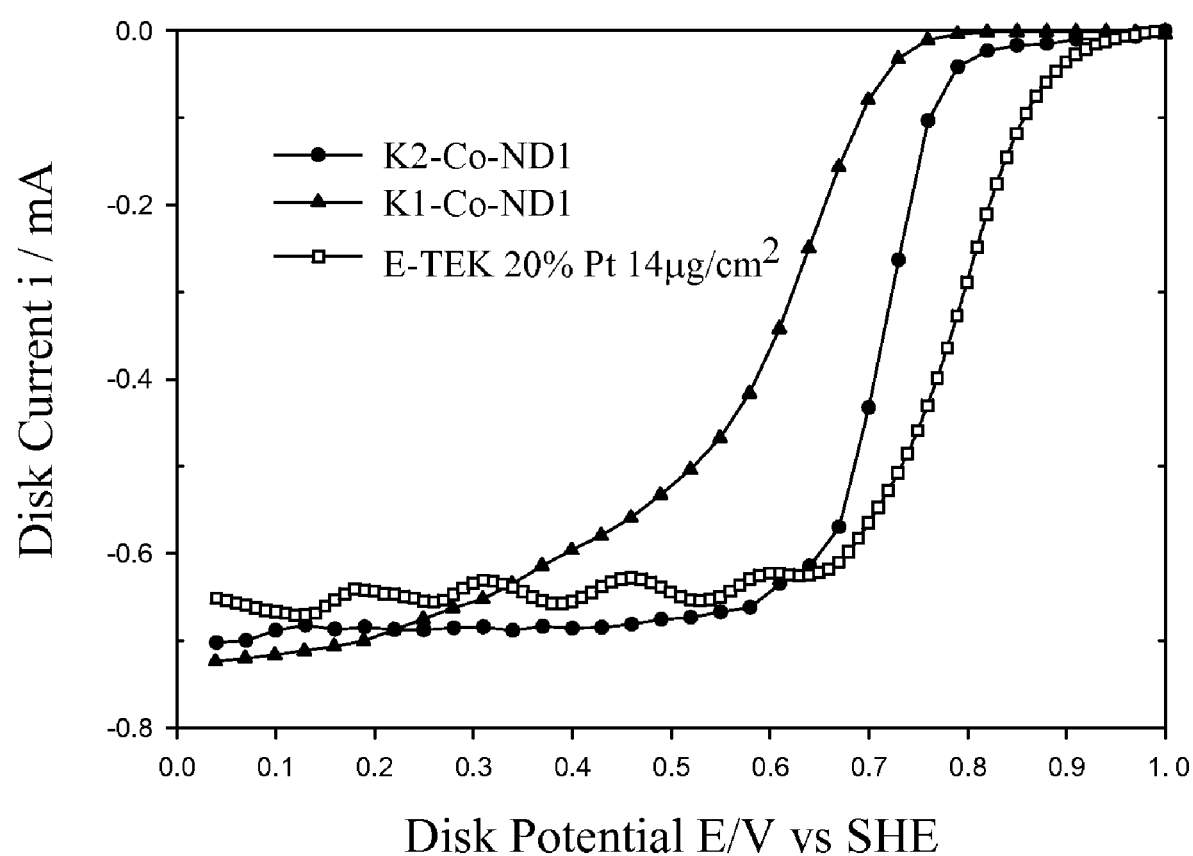
FIG. 9 illustrates catalytic activities of the carbon composite catalysts synthesized on the un-oxidized (K1) and oxidized (K2) carbon supports. The catalyst was prepared with cobalt ethylene diamine. The experiments were performed in 0.5 M $H_2SO_4$ solution saturated with $O_2$ using a potential scan rate of 5 mV s$^{-1}$ and a rotation speed of 900 rpm.

B-2. Process Optimization for Preparation of Carbon Composite Catalysts (a) Effect of surface oxygen groups on the carbon support: The effect of oxidation on the dispersion and the activity of cobalt chelate complexes was studied by testing the samples of heat-treated cobalt ethylene diamine on the oxidized carbon and on the un-oxidized carbon. The results are shown in FIG. 9. The electrocatalyst on the oxidized carbon showed better activity than the catalyst on the un-oxidized carbon. The catalyst supported on the un-oxidized carbon exhibits activation overpotential of 470 mV oxygen reduction. The diffusion-limited plateau of the polarization curve is not well-defined. However, with the use of nitric acid-treated oxidized carbon, activity towards oxygen reduction increases. A single steep reduction wave with a well-developed limiting plateau similar to that of Pt catalysts is observed. The activation overpotential for oxygen reduction on the catalyst on the oxidized carbon is decreased by 60 mV as compared to the catalyst on the un-oxidized carbon.

Figure 10:
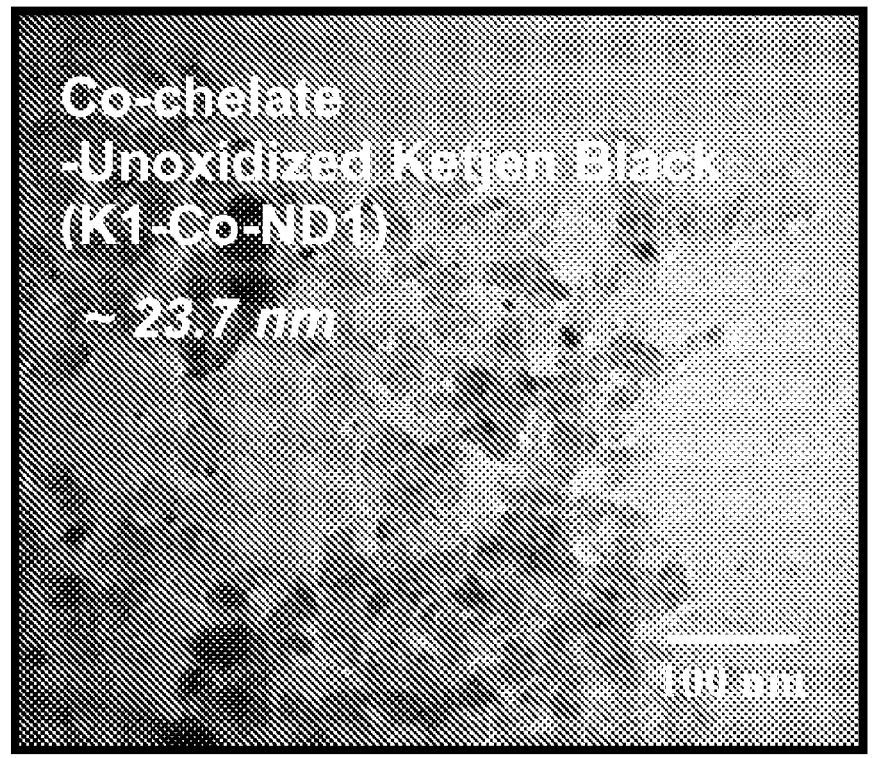
FIG. 10 illustrates TEM images of the carbon composite catalysts synthesized on the un-oxidized (K1) and oxidized (K2) carbon supports. The catalyst was prepared with cobalt ethylene diamine.
Figure 10:
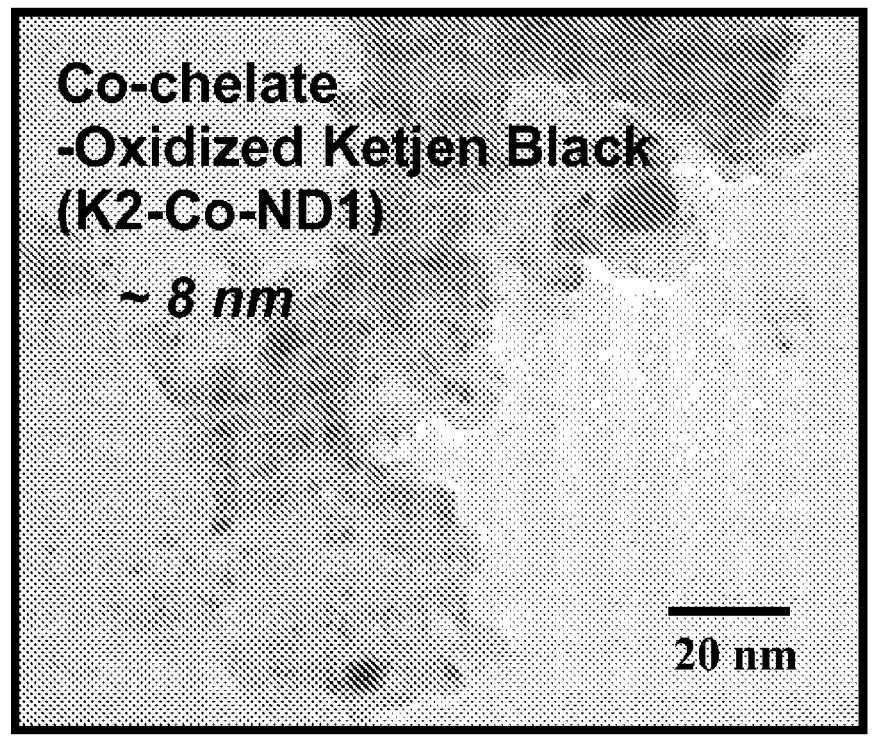

Nitrogen fixation on carbon from nitrogen containing precursors increases with the amount of oxygen surface groups, with one atom of nitrogen being added for every oxygen atom in the quinone structure. Such quinone groups form acidic sites on the carbon surface which favor the absorption of the basic cobalt ethylene diamine complex. This phenomenon results in an increase in dispersion of the catalyst. FIG. 10 compares the TEM images of heat-treated cobalt ethylene diamine samples supported on the oxidized carbon and the un-oxidized carbon. The average particle size of the catalyst supported on the un-oxidized carbon is approximately 23.7 nm, while the particle size for the catalyst loaded on the oxidized support is about 9.5 nm. Thus, the surface quinone groups cause a better dispersion of the cobalt ethylene diamine complex. By increasing the number of oxygen groups on the carbon support, the dispersion of the catalysts, as well as their ultimate performance, is increased.

(b) Effect of carbon surface area and pore size distribution: The effect of surface area and pore size distribution of the carbon support on the activity of heat-treated cobalt ethylene diamine catalysts was studied using three commercial carbons, namely Ketjen Black EC-300 J, Vulcan XC-72 and Black Pearl 2000.

The total specific surface areas, mesopore areas and micropore areas of the as-received carbon supports are summarized in Table 1. Only the mesopores with pore diameters of 2-50 nm are accessible to nitric acid oxidation since they possess a combination of high surface area and large pore diameter. The area inside the micropores with a diameter smaller than 2 nm is inaccessible for nitric acid oxidation. Hence, higher surface area does not necessarily mean higher number of such oxidation-prone sites. Since the micropores are not accessible for nitric acid oxidation, the amount of quinone groups in acid treated Black Pearl does not increase when compared with that of Ketjen Black.

Figure 11:
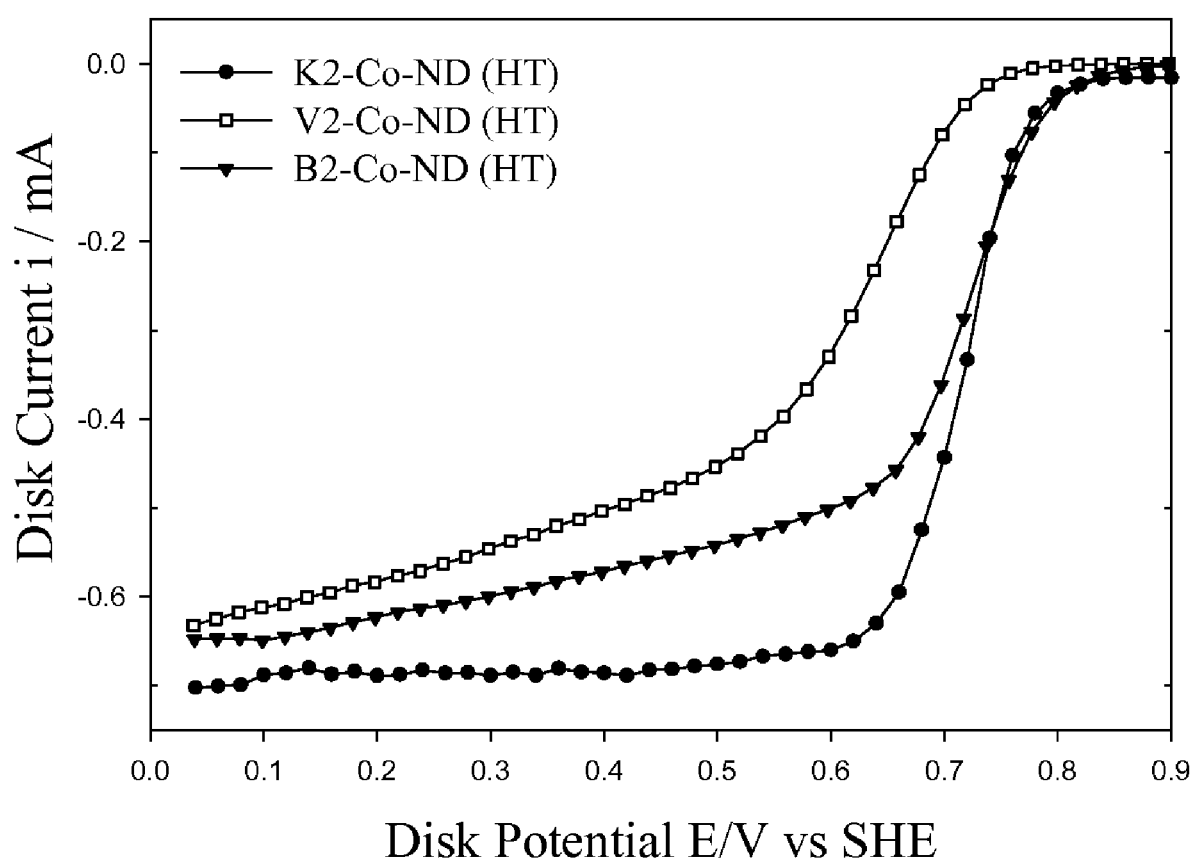
FIG. 11 illustrates catalytic activities of the carbon composite catalysts synthesized on the oxidized Ketjen Black (K2), Vulcan (V2) and Black Pearl (B2) supports. The catalyst was prepared with cobalt ethylene diamine. The experiments were performed in 0.5 M $H_2SO_4$ solution saturated with $O_2$ using a potential scan rate of 5 mV s$^{-1}$ and a rotation speed of 900 rpm.

FIG. 11 shows polarization curves in 0.5 M $H_2SO_4$ of cobalt ethylene diamine complex loaded on the three oxidized carbons. The activity of the heat treated catalyst decreases as follows on the oxidized carbons: Ketjen Black>Black Pearl>Vulcan. The catalyst performance increases with increased dispersion of the catalyst which increases with the amount of quinone groups on carbon surface.

Figure 12:
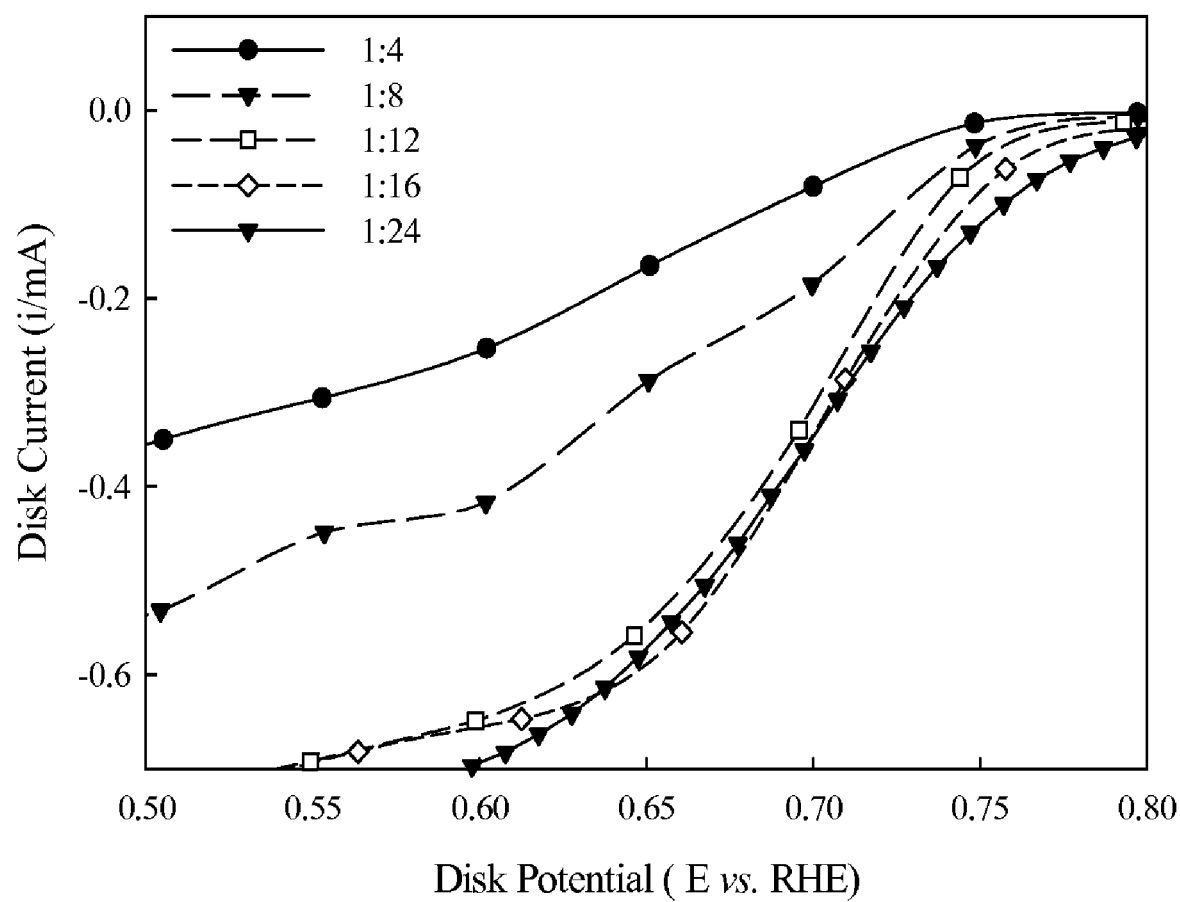
FIG. 12 illustrates catalytic activities of the carbon composite catalysts synthesized using different cobalt:nitrogen ratios. The catalyst was prepared with cobalt ethylene diamine. The experiments were performed in 0.5 M $H_2SO_4$ solution saturated with $O_2$ using a potential scan rate of 5 mV s$^{-1}$ and a rotation speed of 900 rpm.

(c) Effect of Co:N ratio: In all catalysts, the weight % of cobalt on carbon was kept around 20%. FIG. 12 shows the polarization curve under RRDE test conditions for the synthesized catalysts with varying Co:nitrogen ratio such as 1:4, 1:8, 1:12, 1:16 and 1:24. Variation of the amount of nitrogen donor revealed an increase in activity towards oxygen reduction by 50-100 mV. Increment in activity with increase in cobalt:nitrogen ratio up to 1:16 was observed. Beyond this no variation was observed.

Figure 13:
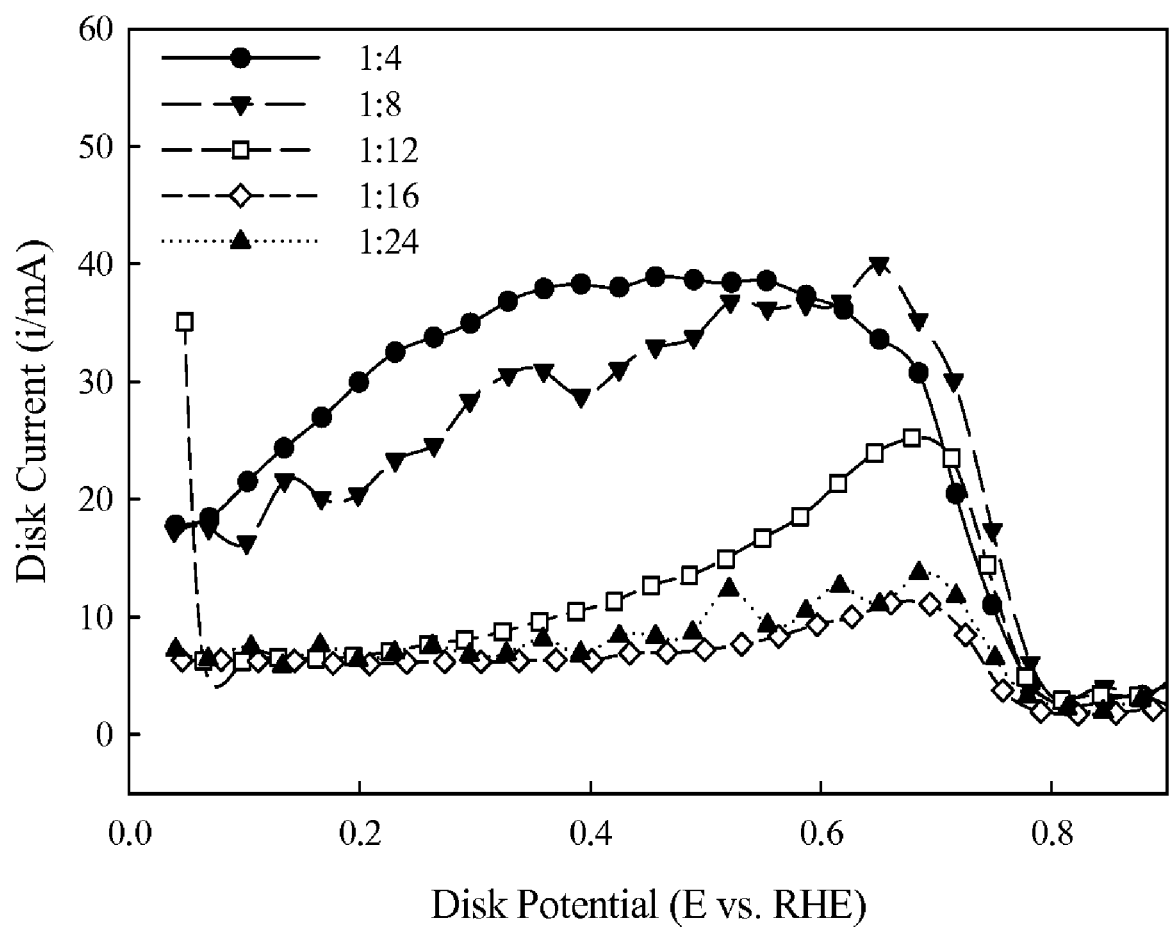
FIG. 13 illustrates catalytic selectivities (% $H_2O_2$) of the carbon composite catalysts synthesized using different cobalt:nitrogen ratios. The catalyst was prepared with cobalt ethylene diamine. The experiments were performed in 0.5 M $H_2SO_4$ solution saturated with $O_2$ using a potential scan rate of 5 mV s$^{-1}$ and a rotation speed of 900 rpm.

FIG. 13 gives the amount of hydrogen peroxide generated as a function of the metal:nitrogen ratio. Increase in nitrogen content decreases the amount of hydrogen peroxide produced. The concentration of hydrogen peroxide generated is close to 11% for sample prepared with 1:16 ratio in comparison with 35% for catalyst prepared from 1:4 ratio.

Figure 14:
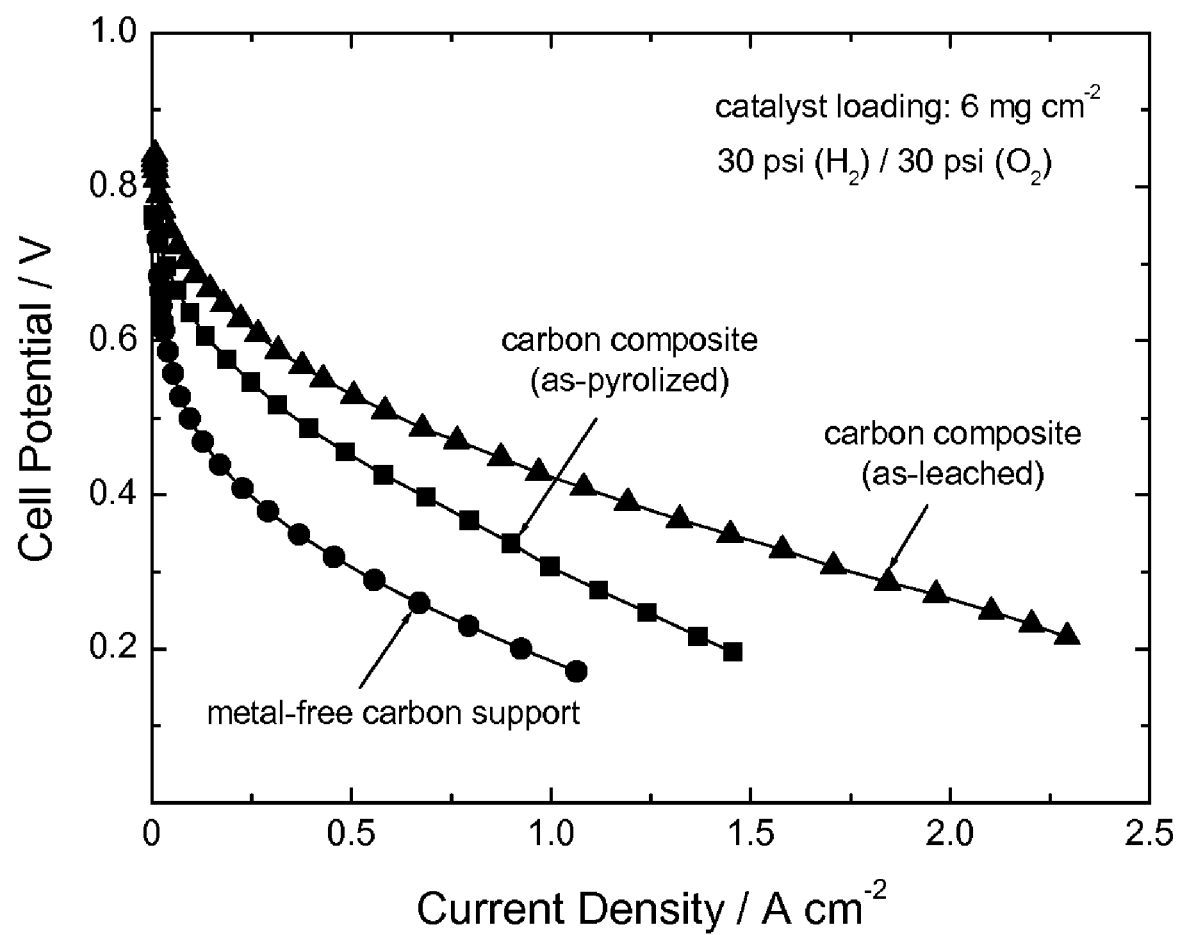
FIG. 14 illustrates polarization curves of PEM fuel cells prepared with the different cathode catalysts: the metal-free carbon support, the as-pyrolized carbon composite catalyst, and the as-leached carbon composite catalyst. The experiments were performed under the following conditions: (i) cathode catalyst loading=6 mg cm$^{-2}$, (ii) $H_2$ back pressure=30 psi, (iii) $O_2$ back pressure=30 psi, and (iv) cell temperature=75° C.

B-3. Electrocatalytic Activity and Selectivity of the Optimized Carbon Composite Catalyst for Oxygen Reduction FIG. 14 presents the polarization curves of PEM fuel cells prepared with the different cathode catalysts: the metal-free carbon support, the as-pyrolized carbon composite catalyst, and the as-leached carbon composite catalyst. The cathode catalyst loadings were maintained at 6.0 mg $cm^{-2}$. The experiments were performed using 30 psi back pressure on both anode and cathode compartments. Ohmic potential drop was not compensated for in the measurement. The fuel cell performance increased gradually after the pyrolysis and the chemical leaching. Particularly, it should be noted that the subsequent dissolution of Co and Fe metals from the as-pyrolized catalyst does not cause any activity loss, but rather increases the activity. The PEM fuel cell with the as-leached carbon composite catalyst showed the current density of 2.3 A $cm^{-2}$ at 0.2 V.

Table 2 summarizes % $H_2O_2$ as a function of disk potential determined for the different catalysts: the metal-free carbon support, the as-pyrolized carbon composite catalyst, the as-leached carbon composite catalyst, and the conventional Pt/C catalyst (20 wt % Pt, E-TEK). It is known that oxygen reduction to $H_2O_2$ is predominant on most of carboneous materials and Co-based macrocyclic compounds. However, the metal-free carbon catalyst, which had been used as a support in this study, generated less than 5% $H_2O_2$. The as-pyrolized carbon composite catalyst produced a relatively large amount of $H_2O_2$, due probably to excess transition metals on the carbon support. Upon the subsequent removal of excess metal elements, the $H_2O_2$ amount decreased to a level less than 2%. Notice that the Pt catalyst generated 1 to 2% $H_2O_2$.

Figure 15:
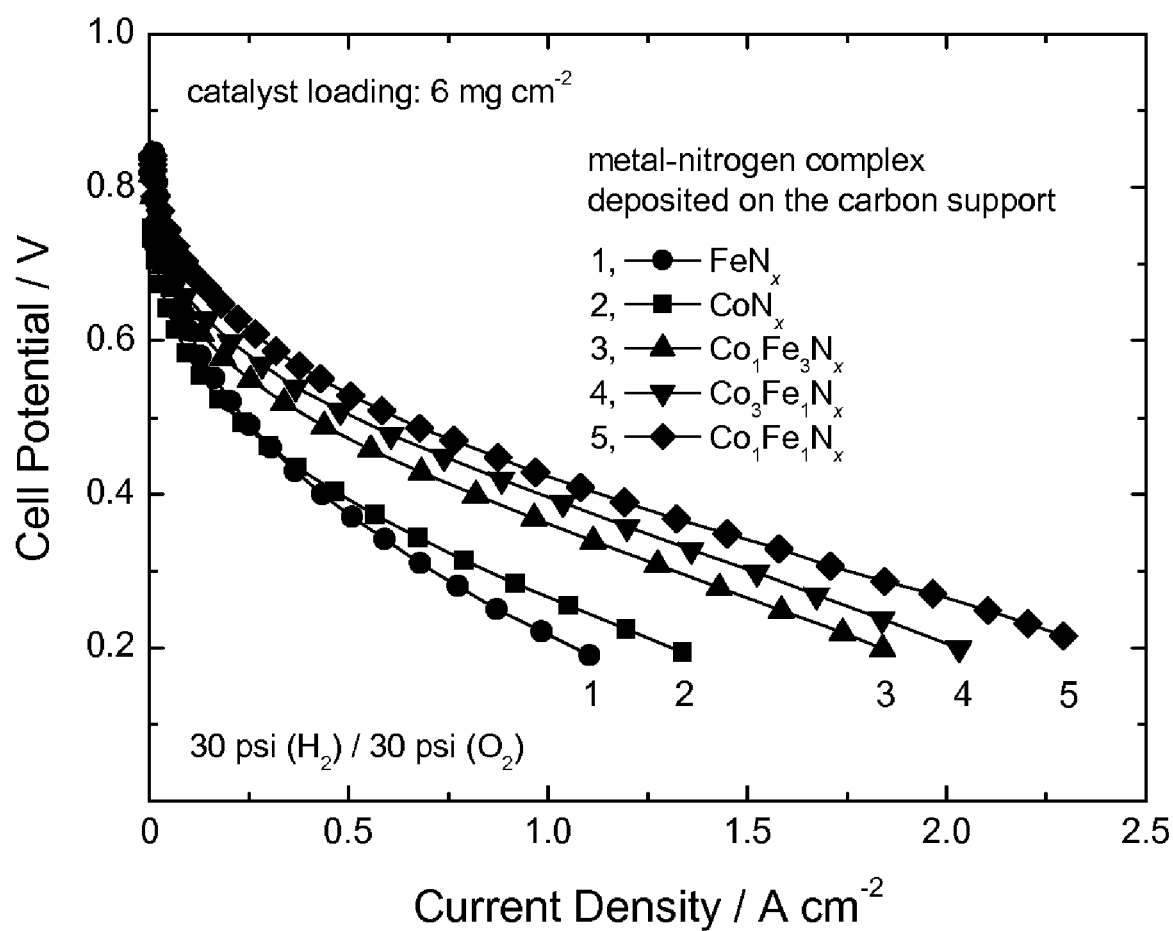
FIG. 15 illustrates polarization curves of PEM fuel cells prepared with the carbon composite catalysts. The catalysts were prepared using the metal-nitrogen complexes with different compositions. The experiments were performed under the following conditions: (i) cathode catalyst loading=6 mg cm$^{-2}$, (ii) $H_2$ back pressure=30 psi, (iii) $O_2$ back pressure=30 psi, and (iv) cell temperature=75° C.
Figure 16:
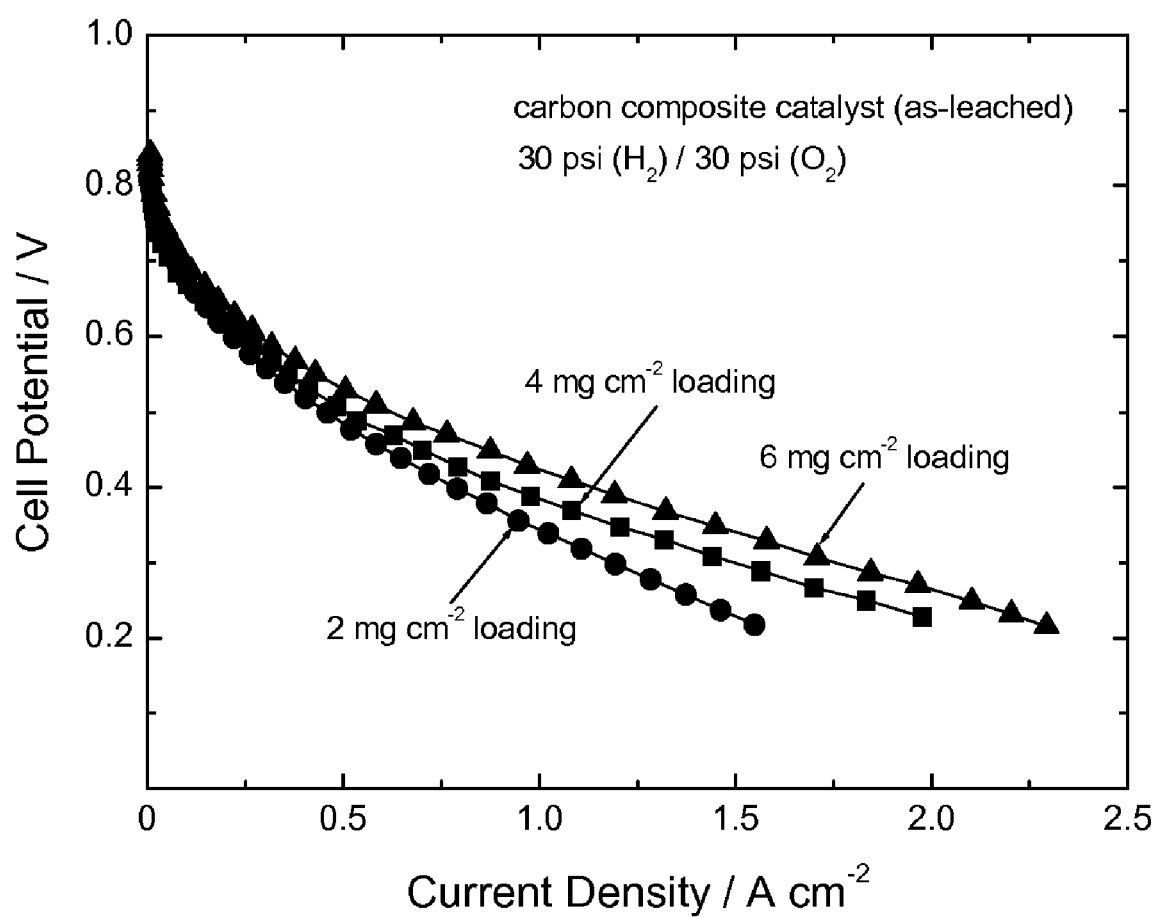
FIG. 16 illustrates PEM fuel cell performances for different loadings of the optimized carbon composite catalyst. The experiments were performed under the following conditions: (i) cathode catalyst loading=2-6 mg cm$^{-2}$, (ii) $H_2$ back pressure=30 psi, (iii) $O_2$ back pressure=30 psi, and (iv) cell temperature=75° C.

The carbon composite catalysts were synthesized by the deposition of the metal-nitrogen complexes with different compositions (i.e., $FeN_x$, $CoN_x$, $CO_1Fe_3N_x$, $CO_3Fe_1N_x$, and $CO_1Fe_1N_x$), followed by the pyrolysis and the chemical leaching. The fuel cell test results are summarized in FIG. 15. The use of Co—Fe—N complex resulted in an improved activity when compared with Co—N and Fe—N complexes, and the maximum performance was achieved for $CO_1Fe_1N_x$. The fuel cell performances of the optimized carbon composite catalyst are presented in FIG. 16 for various cathode loadings of 2.0-6.0 mg $cm^{-2}$.

The electrochemical characterization studies show that the new method involving the $CO_1Fe_1N_x$ deposition followed by the pyrolysis and the chemical leaching produces the carbon composite catalyst with superior catalytic activity and selectivity to any of non-precious metal catalysts reported in the literature.

Figure 17:
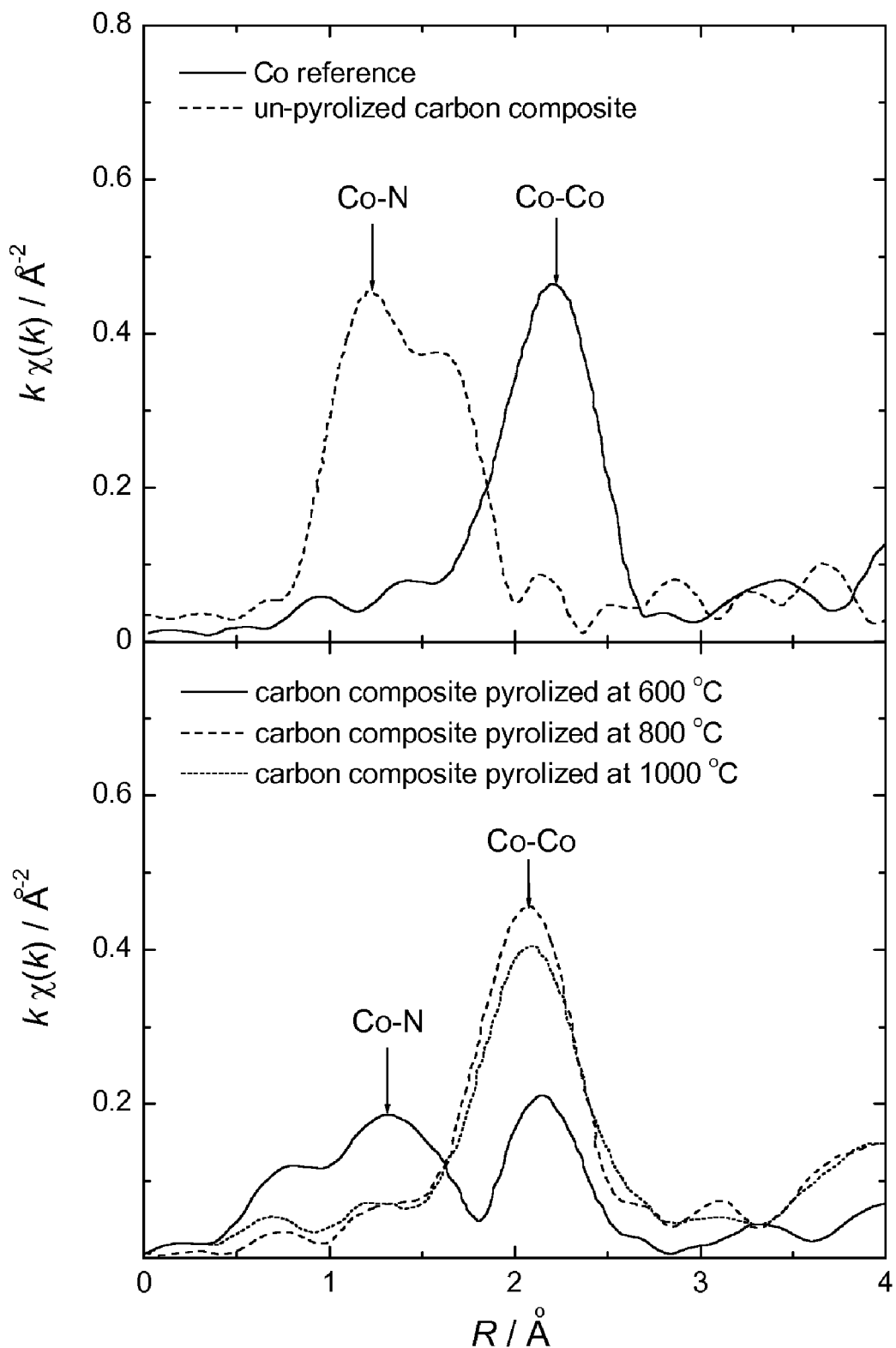
FIG. 17 illustrates $k^1$-weighted extended X-ray absorption fine structure (EXAFS) data for the carbon composite catalysts pyrolyzed at various temperatures.

B-4. Characterizations of metal-nitrogen complexes and metallic species in the carbon composite catalyst: FIG. 17 demonstrates the $k^1$-weighted extended X-ray absorption fine structure (EXAFS) spectra in R space for the carbon composite catalysts pyrolyzed at various temperatures. The catalyst was prepared by the $CoN_x$ deposition onto the metal-free carbon support, followed by the pyrolysis. No chemical leaching was conducted on the pyrolized catalysts. For comparison, a reference spectrum for a pure cobalt foil is given in FIG. 17. The major two peaks centered at R values of ca. 1.2 and 2.1 Å correspond to the Co—N and Co—Co interactions, respectively.

The EXAFS spectrum for the un-pyrolyzed catalyst shows only a dominant Co—N peak, which confirms the presence of the cobalt species coordinated with nitrogen groups on the carbon surface. The Co—Co peak becomes strong with increasing the pyrolysis temperature, and only a Co—Co peak is observed when the catalyst was pyrolized at 800 and 1000° C. This means that the $CoN_x$ chelate complexes decompose at high pyrolysis temperatures above 800 0176 C, resulting in the formation of the metallic Co species. The EXAFS analysis supports the experimental finding of Yeager et al. that after the heat-treatment of Co-TMPP and Fe-TMPP at 800° C., neither Co nor Fe was detected in the Mossbauer spectra in a form corresponding to coordination with nitrogen. Therefore, it is clear that the metal-nitrogen complexes are not responsible for the observed activity for oxygen reduction.

Figure 18A:
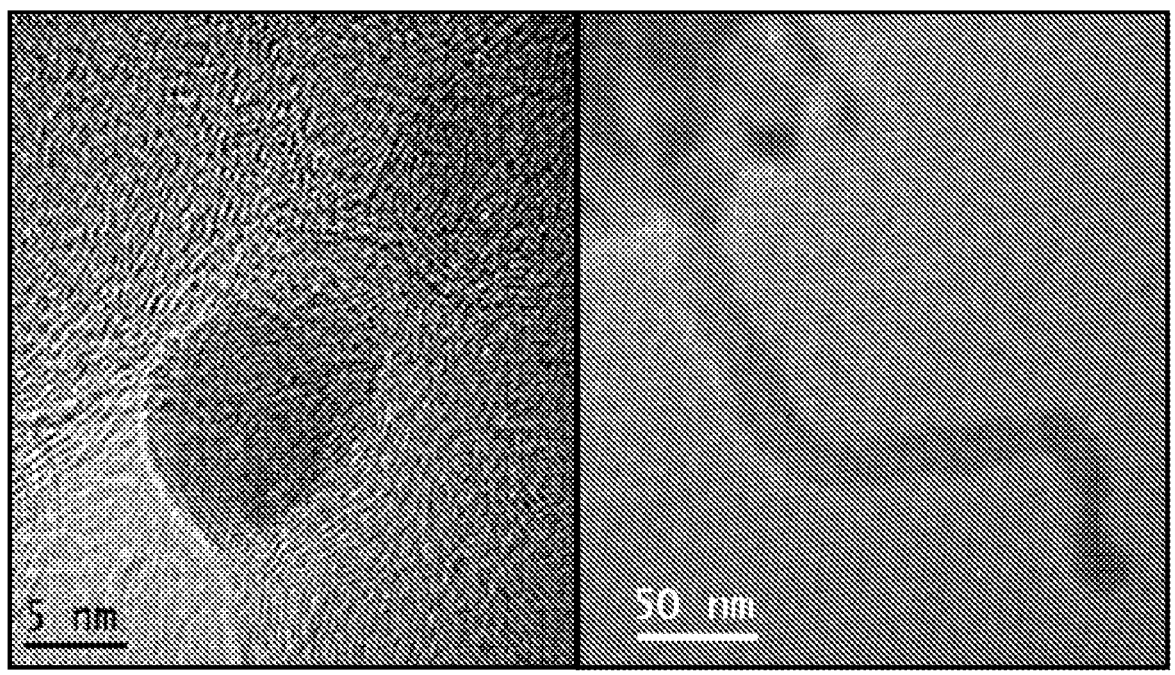
FIG. 18 illustrates (a) TEM images and (b) the power XRD pattern of the carbon composite catalyst.
Figure 18B:
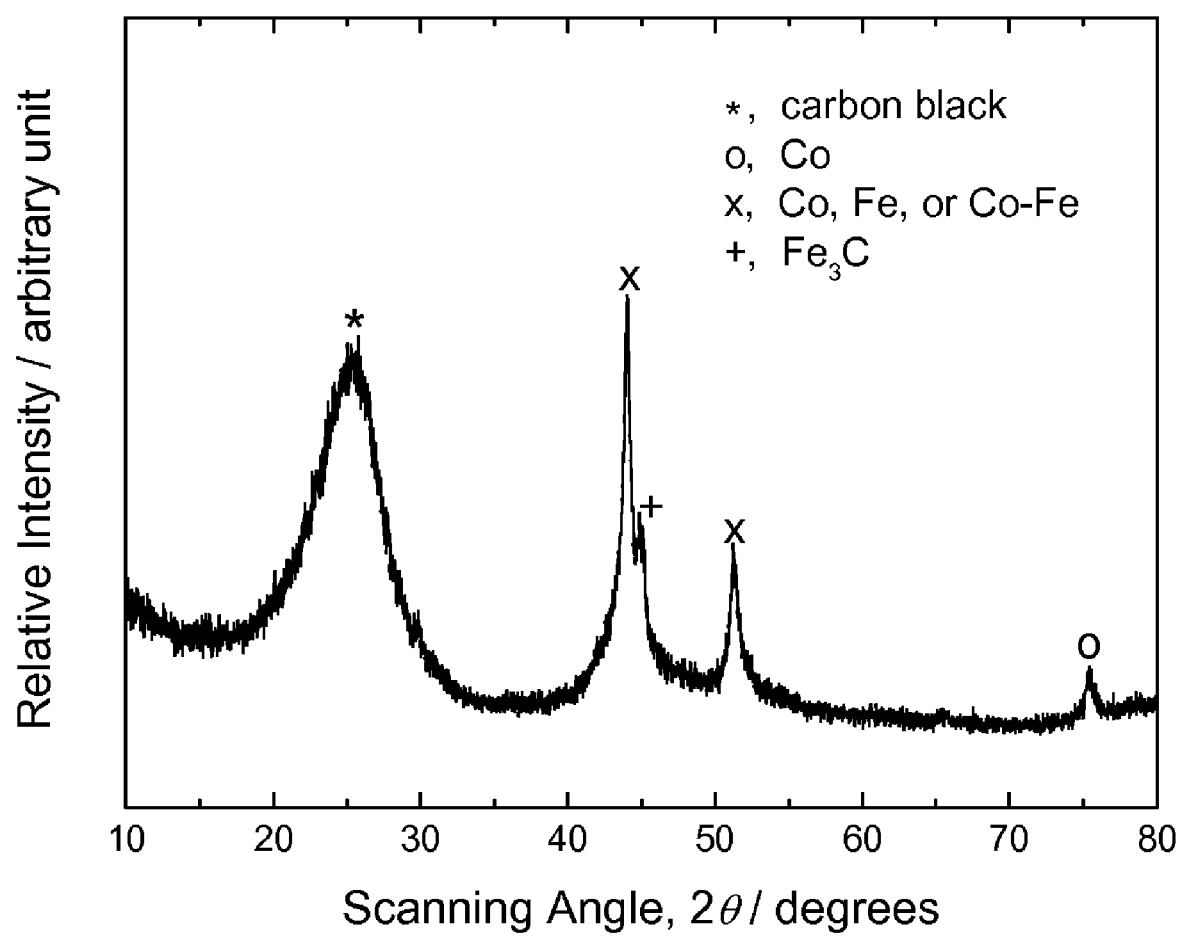

FIGS. 18(*a*) and (*b*) represent the TEM images and the power XRD pattern of the carbon composite catalyst, respectively. The carbon composite catalyst was prepared as follows: (i) the $CO_1Fe_1N_x$ deposition on the metal-free carbon support, (ii) the pyrolysis at 900° C., and (iii) the chemical leaching in 0.5 M $H_2SO_4$ solution at 90° C. It is seen in FIG. 18(*a*) that a metal particle was covered with graphitic layers, and a nanostructured tube or fiber of graphitic carbon was formed as a result of pyrolysis in the presence of Co and Fe metals. As indicated in FIG. 18(*b*), the XRD pattern shows the characteristic diffraction peaks that can be assigned to a mixture of the metallic phases (i.e., Co, Fe and $Co_xFe_y$) and to the cementite phase ($Fe_3C$).

Table 3 summarizes the concentrations of Co and Fe in the carbon composite catalyst obtained after the chemical leaching in $H_2SO_4$ solution. The concentrations were determined by inductively coupled plasma (ICP)-mass spectroscopy (MS) and XPS techniques. ICP-MS analysis shows that 4.6 wt % Co and 1.4 wt % Fe are present in the as-leached catalyst, whereas XPS detected no metal traces. Since the escape depth of photoelectrons is only a few nanometers, XPS analysis provides the surface composition of the carbon composite catalyst. Therefore, the composition analysis by two techniques indicates that Co and Fe particles on the pyrolyzed catalyst surface were removed by the subsequent chemical treatment in $H_2SO_4$ solution, whereas metal particles encased in the carbon structure survived the leaching treatment.

The materials characterization studies indicate that (i) the metal-nitrogen chelate complexes are not stable at high temperatures above 800° C., (ii) no metallic species is present on the catalyst surface after chemical post-treatment, and (iii) the carbon surface is responsible for the observed activity for oxygen reduction.

Figure 28:
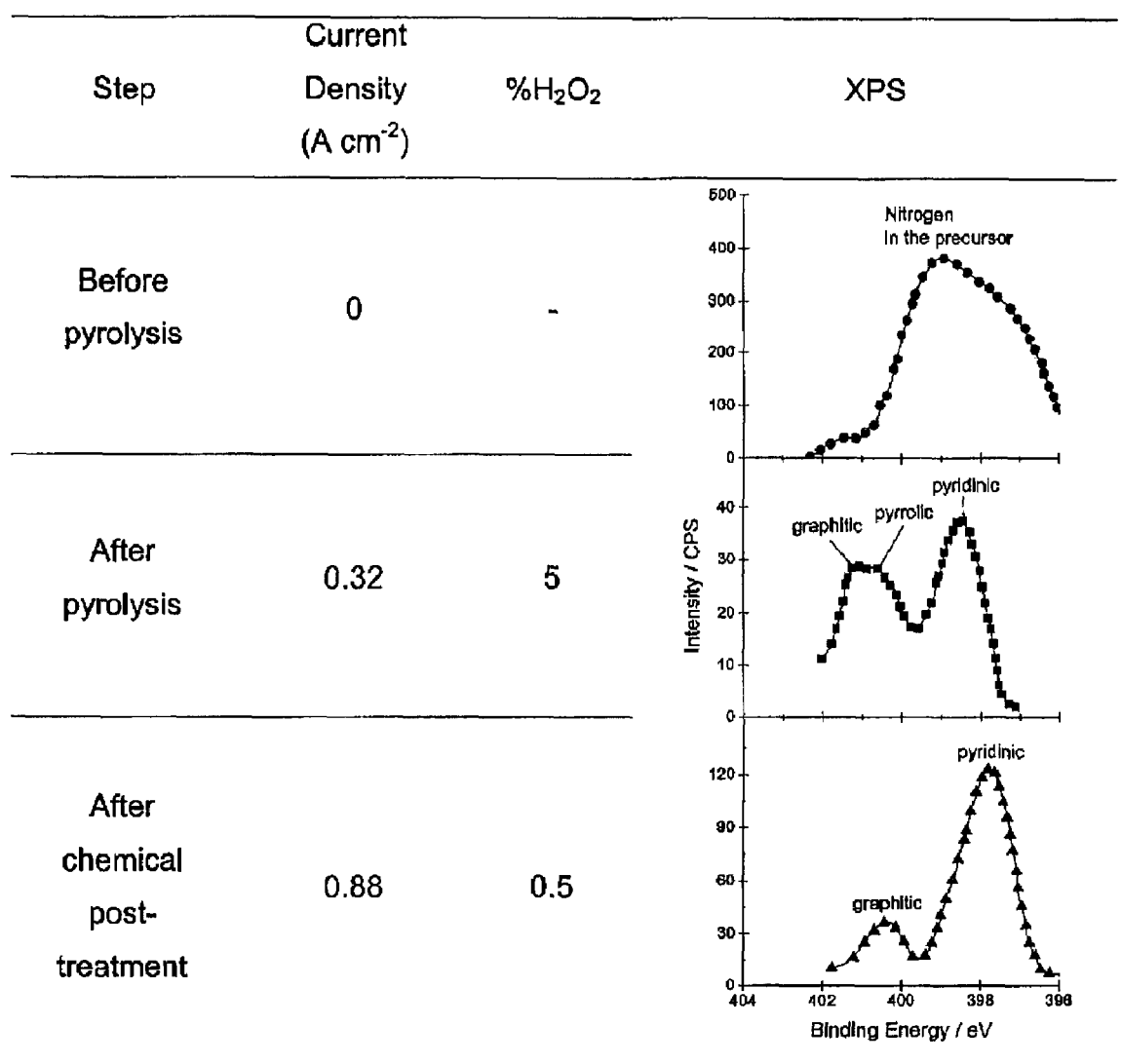
FIG. 28 illustrates catalytic activity, selectivity and XPS spectrum at each synthesis step of carbon composite catalyst. The current density and the amount of H$_2$O$_2$ were determined at 0.4 V in a fuel cell and an RRDE, respectively.

B-5. Characterizations of Nitrogen Functional Groups on the Carbon Composite Catalysts The nature of nitrogen functional groups were identified using XPS at each synthesis step: (i) before "catalyzed pyrolysis", (ii) after "catalyzed pyrolysis", and (iii) after chemical post-treatment, and the results are summarized in FIG. 28 along with the fuel cell performances of each sample. The current density and the amount of $H_2O_2$ were determined at 0.4 V in a fuel cell and an RRDE, respectively. The activity was determined to be almost zero for the non-pyrolized catalyst, but the activity and selectivity gradually increased after pyrolysis and chemical post-treatment. XPS data obtained before pyrolysis show only nitrogen functional group in the N-precursor. Then, high-temperature pyrolysis results in the formation of pyridinic, pyrrolic and graphitic nitrogen groups. Finally, chemical post-treatment increases the relative concentration of pyridinic nitrogen while removing pyrrolic nitrogen. XPS result indicates that high-temperature pyrolysis combined with chemical post-treatment increases the concentration of pyridine-type nitrogen resulting in the increased Lewis basicity, and incorporates the nitrogen into graphitic structures which increases the stability.

Figure 19:
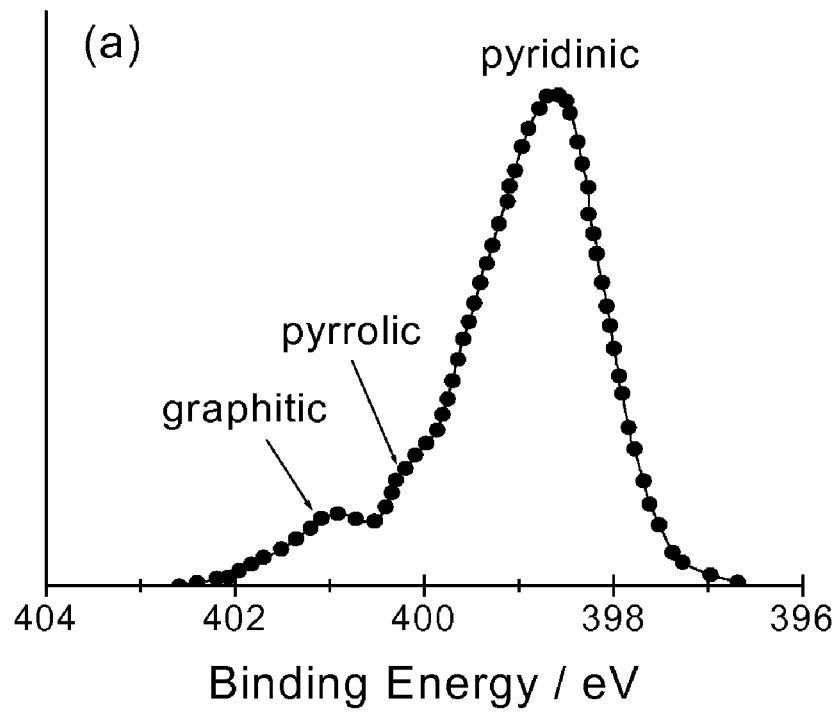
FIG. 19 illustrates XPS spectra of the catalysts pyrolyzed in the absence and presence of $CO_1Fe_1N_x$ complex.
Figure 19:
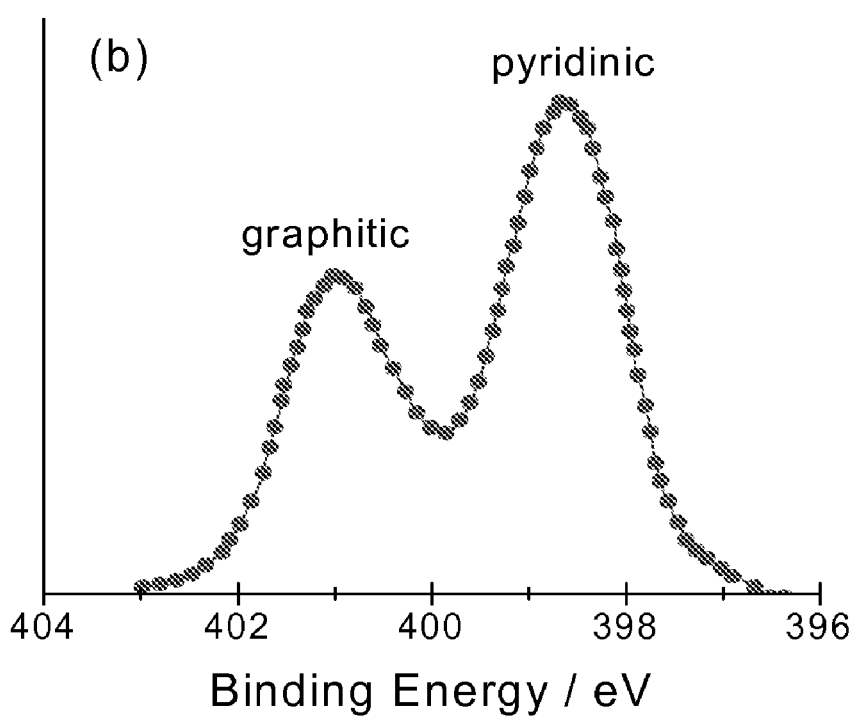

FIG. 19 compares the XPS spectra of the catalysts pyrolyzed in the absence and presence of $CO_1Fe_1N_x$ complex. It is clearly observed that the pyrolysis in the presence of $CO_1Fe_1N_x$ complex facilitates the incorporation of pyridinic and graphitic nitrogen groups, thus leading to high activity and stability of carbon composite catalyst.

C. Synthesis of Pt—Co Catalyst Using the Carbon Composite Support

C-1. Catalyst Preparation

As-received carbon black (Ketjen Black EC 300J) was treated with 9.8 M $HNO_3$ solution at 80° C. for 7 h under refluxing conditions, in order to introduce oxygen functional groups onto the carbon surface. The oxidized carbon specimen was rinsed with de-ionized water, followed by drying under vacuum at 80° C. A cobalt-nitrogen chelate complex ($CoN_x$) was deposited onto the oxidized carbon using $Co(NO_3)_2$ (Aldrich, 98%) and ethylene diamine as Co- and N-precursors, respectively. A desired amount of ethylene diamine was added slowly into 0.015 M $Co(NO_3)_2$ solution in ethanol, followed by the addition of the oxidized carbon powder under stirring conditions. The molar Co:N ratio in the reaction mixture was maintained at 1:16. The reaction mixture was refluxed at 85° C. for 4 h, followed by drying under vacuum at 80° C. The resulting Co-deposited carbon was subjected to heat-treatment in an argon atmosphere at 700° C. and at 8.8 MPa for 3 h. The heat-treated Co/C sample was treated with 0.5 M $H_2SO_4$ at 25° C. for 2 h to remove excess Co on the carbon surface.

4.0 mM $H_2PtCl_6$ and 0.27 M HCl solutions were mixed with de-ionized water containing the Co/C support. 2.0 M sodium formate (HCOONa) solution was added slowly to the reaction mixture, followed by refluxing at 80° C. for 20 h. The resulting Pt—Co/C sample was rinsed with de-ionized water, and then was dried under vacuum at 80° C. for 12 h. Finally, the Pt—Co/C catalyst was heat-treated in an argon atmosphere at 800° C. for 1 h.

C-2. Materials Characterizations

Table 4 summarizes the compositions of the leached Co/C support and the heat-treated Pt—Co/C catalyst analyzed by ICP-MS technique. The Co concentration in the leached Co/C support was 3.0 wt %. The Pt—Co/C catalyst consisted of 16.8 wt % Pt and 2.7 wt % Co (i.e., the total metal loading of 19.5 wt %). The ICP analysis indicates no loss of Co during electroless deposition of Pt from acidic $H_2PtCl_6$—HCl solution.

Figure 20A:
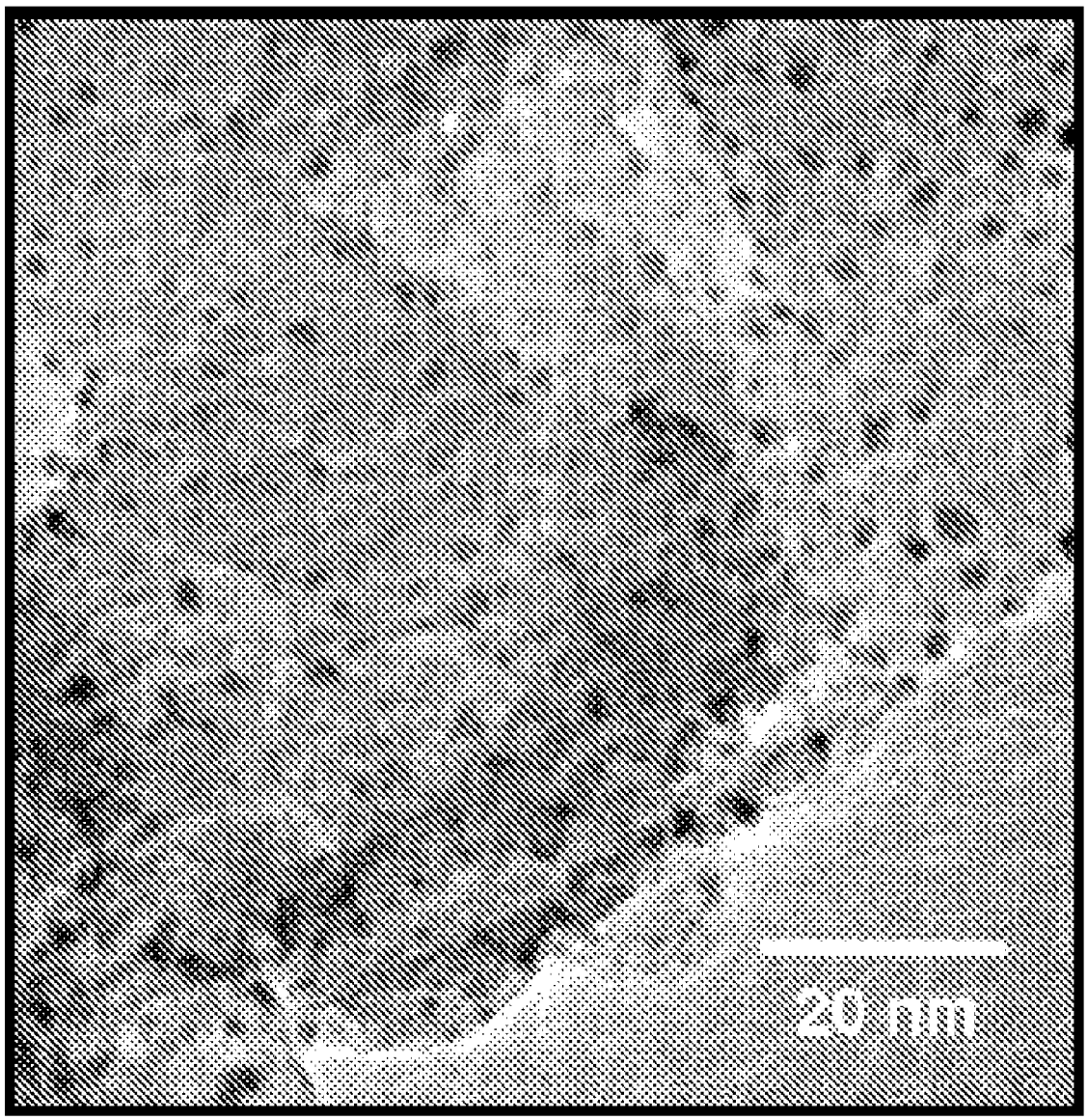
FIG. 20 illustrates TEM images of (a) the leached Co/C support and (b) the heat-treated Pt—Co/C catalyst, and (c) metal particle size distributions determined from the TEM images.
Figure 20B:
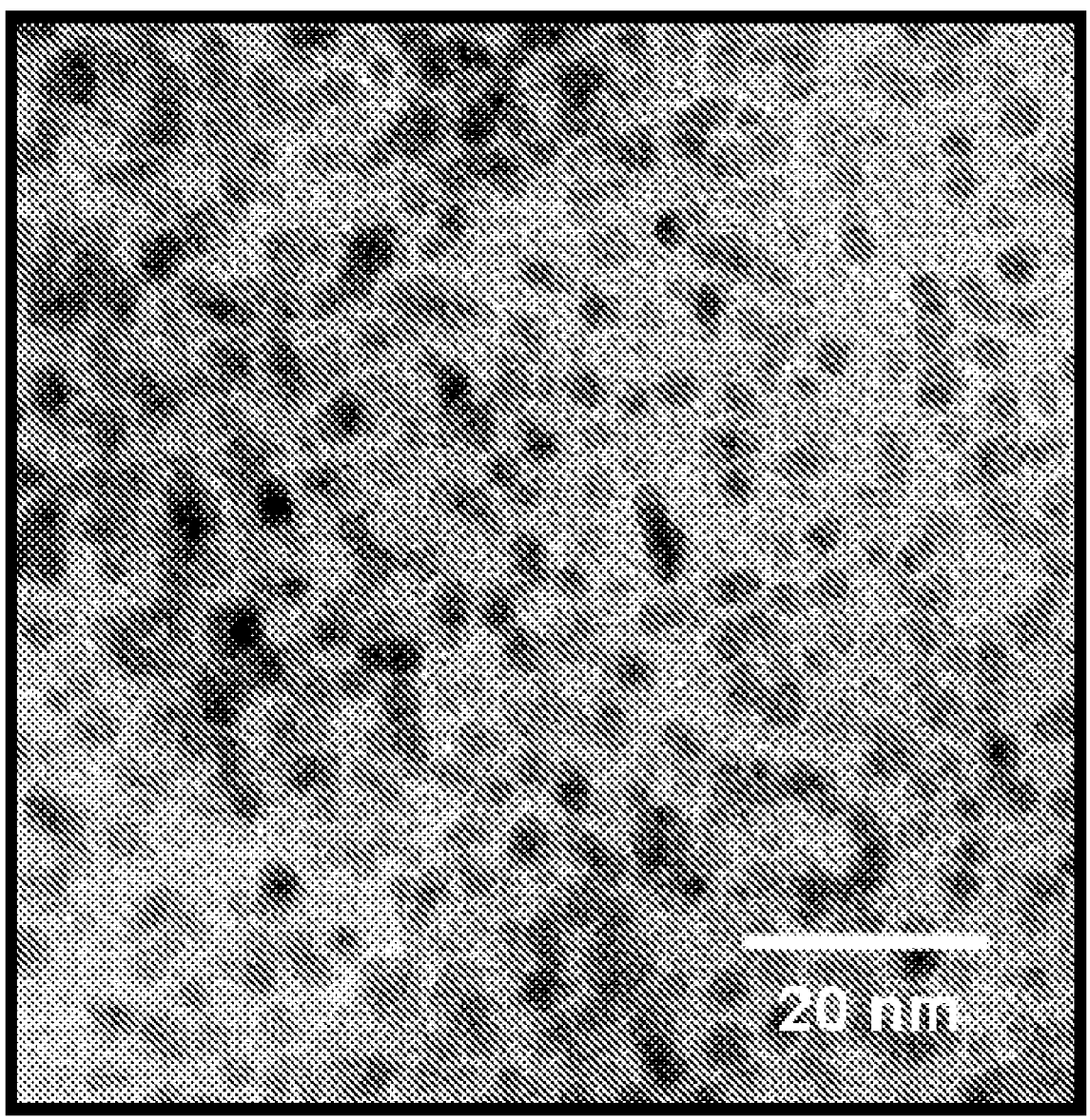
Figure 20C:
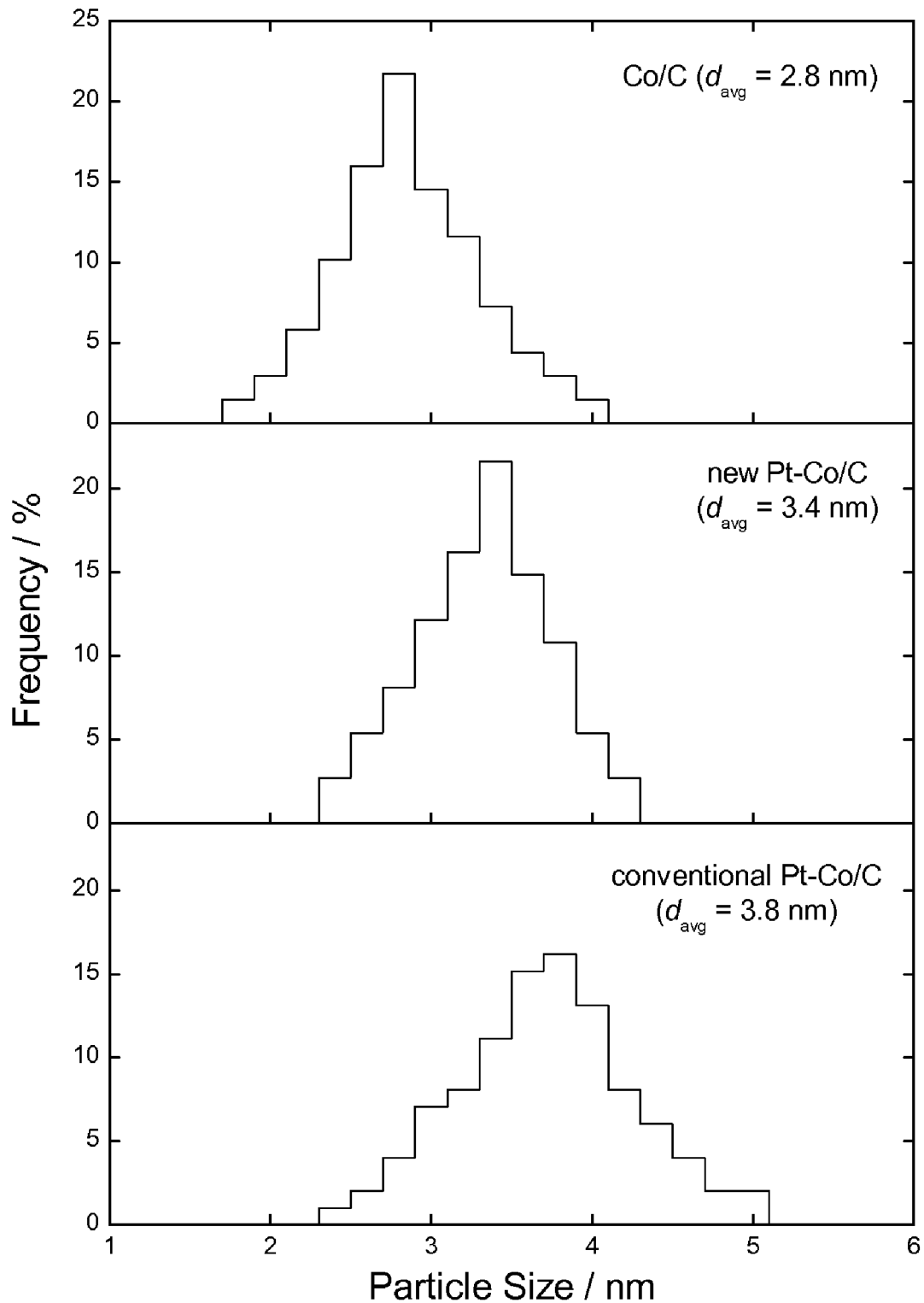

FIGS. 20(*a*) and (*b*) present the TEM images of the leached Co/C support and the heat-treated Pt—Co/C catalyst, respectively. The metal particle size distributions (PSDs) determined from the TEM images are shown in FIG. 20(c) along with the data for a conventional Pt—Co/C catalyst (20 wt % Pt$_3$CO$_1$/C, E-TEK). Co particles are highly dispersed on the oxidized carbon black showing a narrow size distribution, and the average particle size was determined to be approximately 2.8 nm. Upon Pt deposition on the Co/C support, the average particle size slightly increased to 3.4 nm, while the shape of PSD curve remained nearly unchanged. No agglomeration of catalyst particles on the support is observed in FIG. 20(b). The Pt—Co/C catalyst prepared in accordance with certain embodiments of the present disclosure shows a smaller mean particle size and a narrower PSD, as compared with the conventional catalyst (ca. 3.8 nm).

Figure 21:
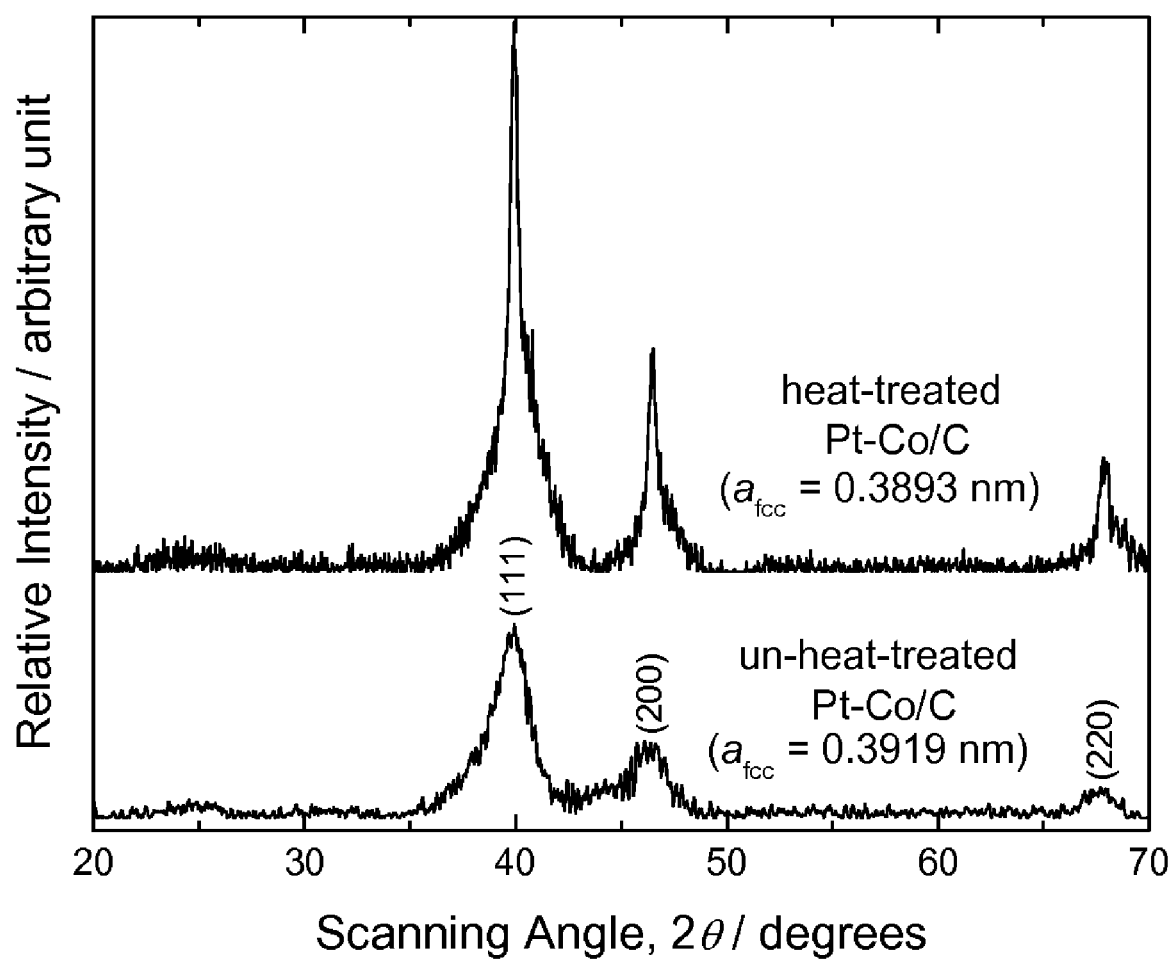
FIG. 21 illustrates powder XRD patterns of the un-heat-treated and heat-treated Pt—Co/C catalysts. The fcc lattice parameters, $a_{fcc}$, determined from the XRD data were given in the figure.

FIG. 21 presents the powder XRD patterns of the un-heat-treated and heat-treated Pt—Co/C catalysts. The XRD pattern of the un-heat-treated Pt—Co/C catalyst shows the characteristic diffraction peaks of the face-centered cubic structure at 2θ=39.7, 46.2 and 67.5° that correspond to (111), (200) and (220) planes, respectively. The diffraction peaks became sharper upon post-heat-treatment, indicating increased crystallite (or particle) sizes. Further, the diffraction peaks shifted slightly towards higher Bragg angles, which indicate a decreased lattice constant due to the formation of Pt—Co alloy. In fact, the fcc lattice parameters of the un-heat-treated and heat-treated Pt—Co catalysts were estimated to be 0.3919 and 0.3893 nm, respectively, from the XRD data in FIG. 21.

C-3. Performance and Stability of Pt—Co Catalysts in PEM Fuel Cell

Figure 22:
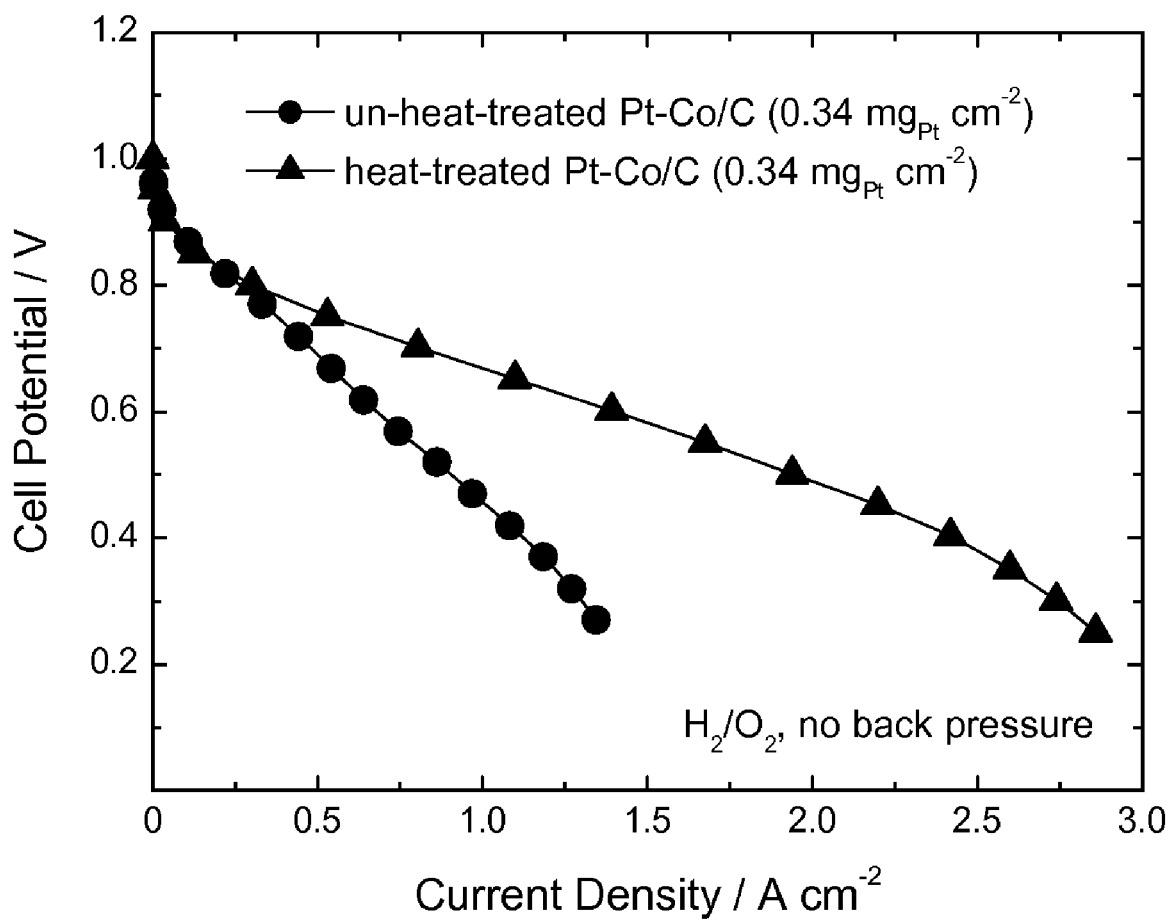
FIG. 22 illustrates polarization curves of the PEM fuel cells prepared with un-heat-treated Pt—Co/C and heat-treated Pt—Co/C. The experiments were performed under the following conditions: (i) Pt loading on the anode=0.5 mg cm$^{-2}$, (ii) $H_2$ flow rate=150 cm$^3$ min$^{-1}$, (iii) $O_2$ flow rate=150 cm$^3$ min$^{-1}$, and (iv) cell temperature=75° C.

FIG. 22 shows polarization curves of the PEM fuel cells prepared with three different catalysts namely: (i) un-heat-treated Pt—Co/C, and (ii) heat-treated Pt—Co/C. Besides the fact that both Pt—Co/C catalysts contains the same amounts of Pt and Co, the heat-treated catalyst exhibits much higher activity, e.g., 1.40 A cm$^{-2}$ at 0.6 V, when compared with the un-heat-treated catalyst (0.67 A cm$^{-2}$). An enhanced activity of the heat-treated Pt—Co/C catalyst results from the alloy formation of Pt and Co, as indicated by the XRD analysis in FIG. 21.

Figure 23:
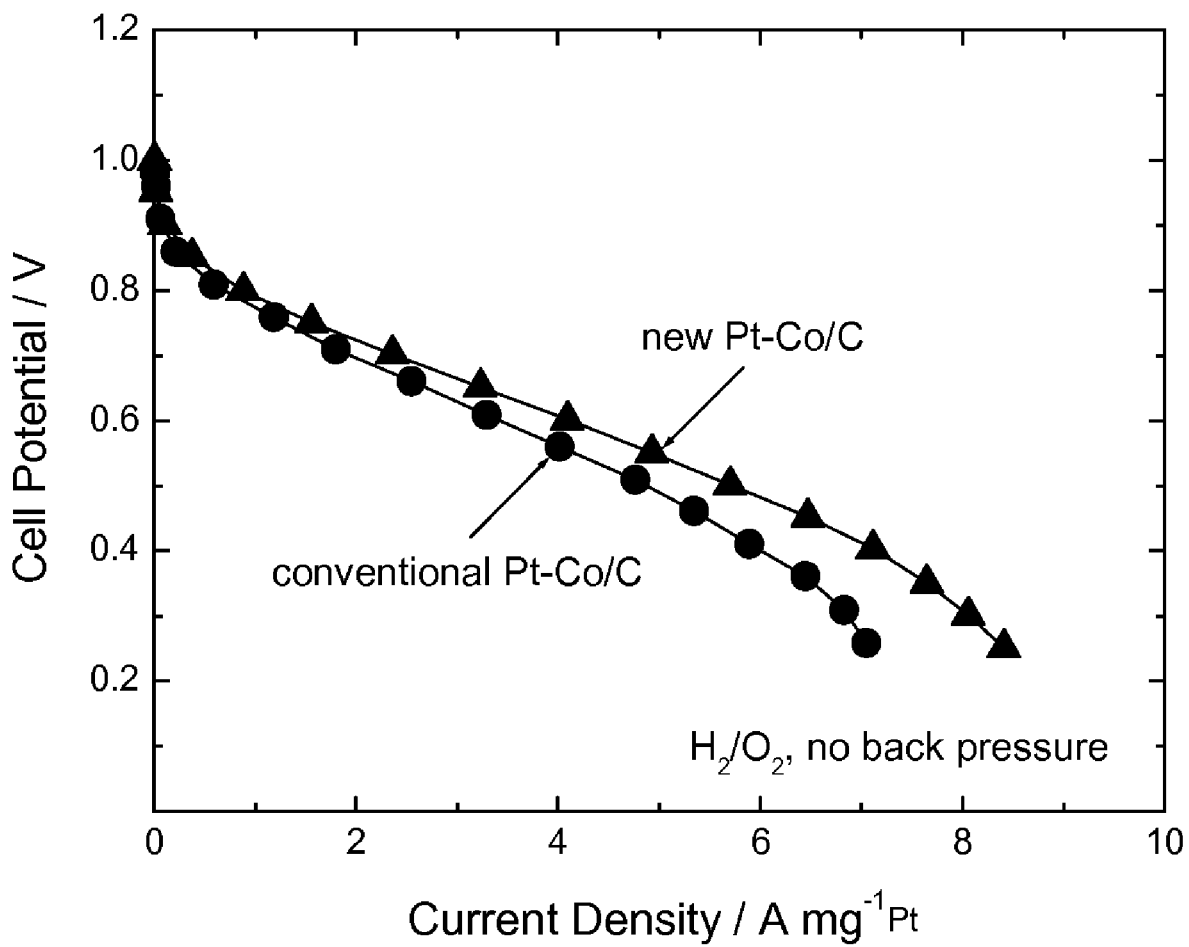
FIG. 23 illustrates polarization curves of the PEM fuel cells with the Pt—Co/C catalyst developed in this study and the conventional Pt—Co/C catalyst. The experiments were performed under the following conditions: (i) Pt loading on the anode=0.5 mg cm$^{-2}$, (ii) Pt—Co loading on the cathode=0.4 mg cm$^{-2}$, (iii) $H_2$ flow rate=150 cm$^3$ min$^{-1}$, (iv) $O_2$ flow rate=150 cm$^3$ min$^{-1}$, and (v) cell temperature=75° C. The measured current density was normalized with respect to the Pt loading in the MEA.

FIG. 23 compares polarization curves of the PEM fuel cells with the Pt—Co/C catalyst developed in this study and a conventional Pt—Co/C catalyst (20 wt % Pt$_3$CO$_1$, E-TEK). The Pt—Co loading in the MEA was maintained at 0.4 mg cm$^{-2}$ for both catalysts. The measured current density was normalized with respect to the Pt loading in the MEA because of a small difference in Pt concentrations in the two catalysts. The polarization measurements clearly show that the new Pt—Co/C catalyst leads to a superior fuel cell performance to the conventional catalyst over the whole potential range. At 0.6 V, the current density for the new Pt—Co/C catalyst was 4.2 A mg$_{Pt}^{-1}$ in comparison to 3.3 A mg$_{Pt}^{-1}$ for the conventional catalyst, i.e. a performance increase of approximately 26%. Based on the above results, the improved catalytic activity of the new Pt—Co/C catalyst over the conventional catalyst may be attributed to (i) a more uniform dispersion of smaller catalyst particles over the support and (ii) the high catalytic activity of Co/C composite used as a support.

Figure 24A:
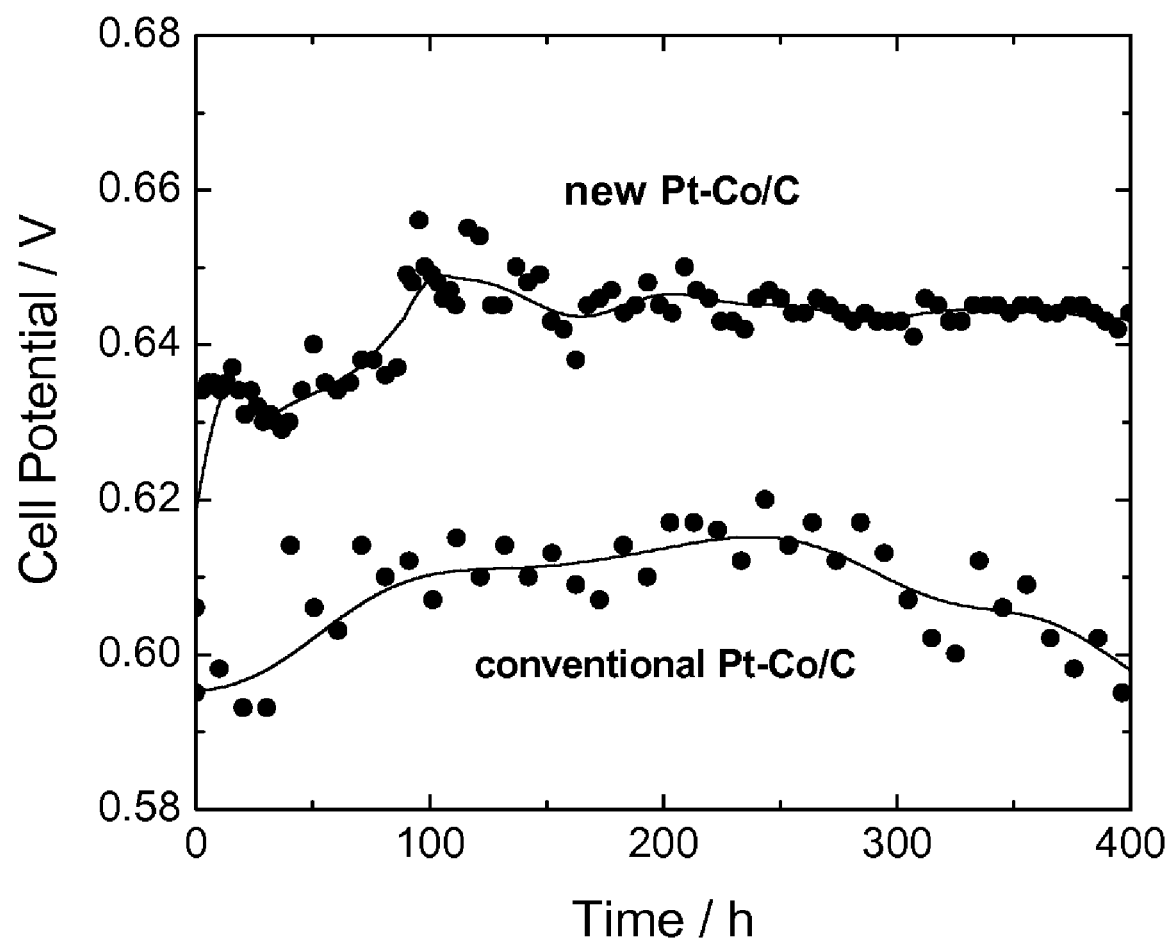
FIG. 24 illustrates (a) potential transients of the PEM fuel cells measured at a constant current density of 1.0 A cm$^{-2}$ using the Pt—Co/C catalyst synthesized in this study and the conventional Pt—Co/C catalyst, and (b) polarization curves for the new Pt—Co/C catalyst measured during stability testing. The experiments were performed under the following conditions: (i) Pt loading on the anode=0.5 mg cm$^{-2}$, (ii) Pt—Co loading on the cathode=0.4 mg cm$^{-2}$, (iii) H$_2$ flow rate=150 cm$^3$ min$^{-1}$, (iv) O$_2$ flow rate=150 cm$^3$ min$^{-1}$, and (v) cell temperature=75° C.
Figure 24B:
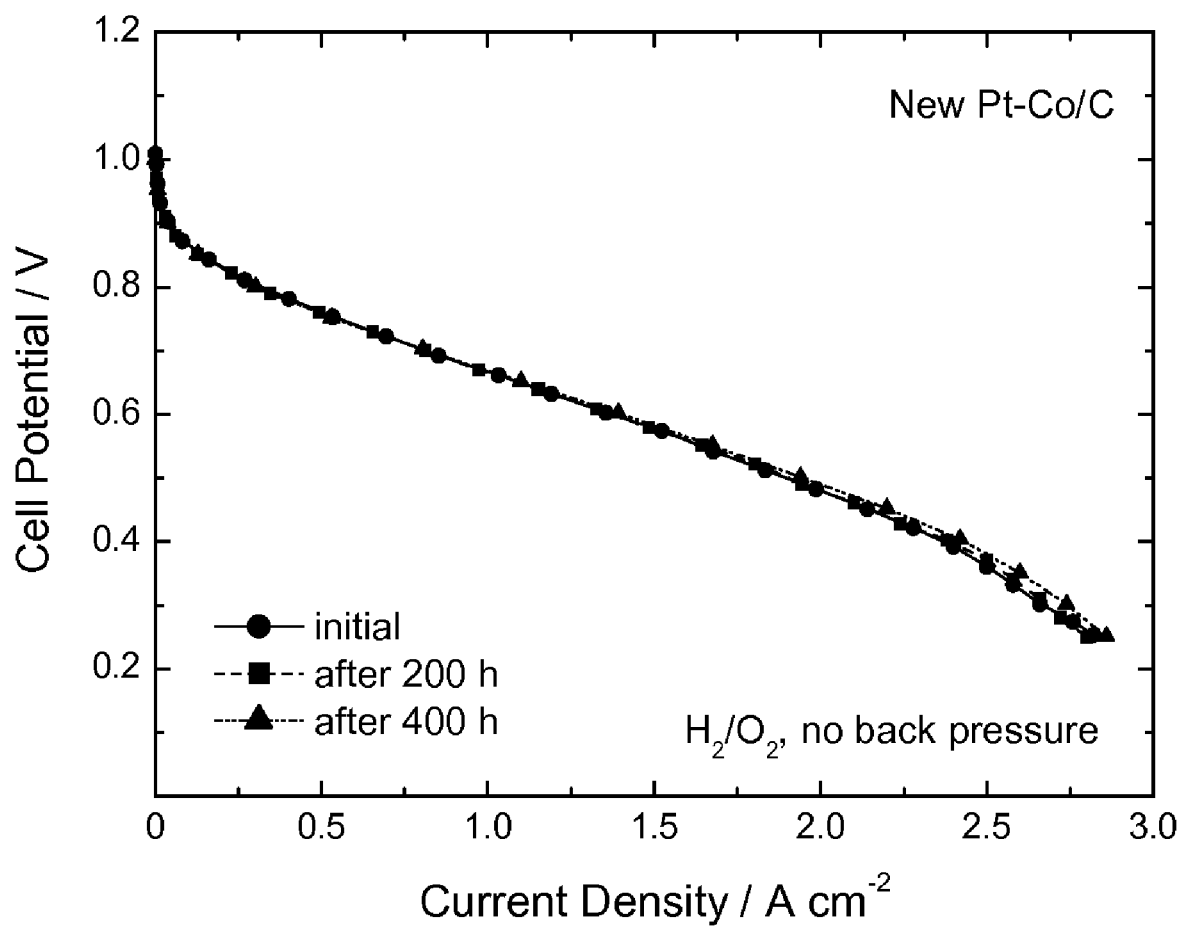

In order to address the stability of Pt—Co/C catalyst in PEM fuel cell, the galvanostatic potential transient technique was performed with a current density of 1.0 A cm$^{-2}$ using H$_2$ and O$_2$, and the polarization curves were periodically measured during stability testing. FIG. 24(a) compares the potential transients of the PEM fuel cells with the new and conventional Pt—Co/C catalysts. The cell potential for the conventional Pt—Co/C catalyst started to decay after ca. 250 h of continuous operation. For the new Pt—Co/C catalyst, on the other hand, the potential transient shows an initial potential increase, followed by a steady-state potential profile of ca. 0.65 V. As shown in FIG. 24(b), no degradation of fuel cell performance was observed when polarization curves were measured after 200 and 400 h of stability testing.

It has been reported that Co leaches out of Pt—Co alloy during fuel cell operation, since Co is thermodynamically unstable at PEM fuel cell potentials in acidic environments. The polymer electrolyte membrane (Nafion™) currently in use in MEA is very susceptible to contamination by Co ions dissolved from the alloy catalyst, due to the limited amount of protonic sites available in the membrane. The MEA cross-sectional analysis by EPMA in our previous study confirmed a significant dissolution of Co from the commercial Pt—Co/C catalyst followed by diffusion into the membrane. The membrane poisoning by dissolved Co elements resulted in a significant deterioration of long-term fuel cell performance.

Figure 25A:
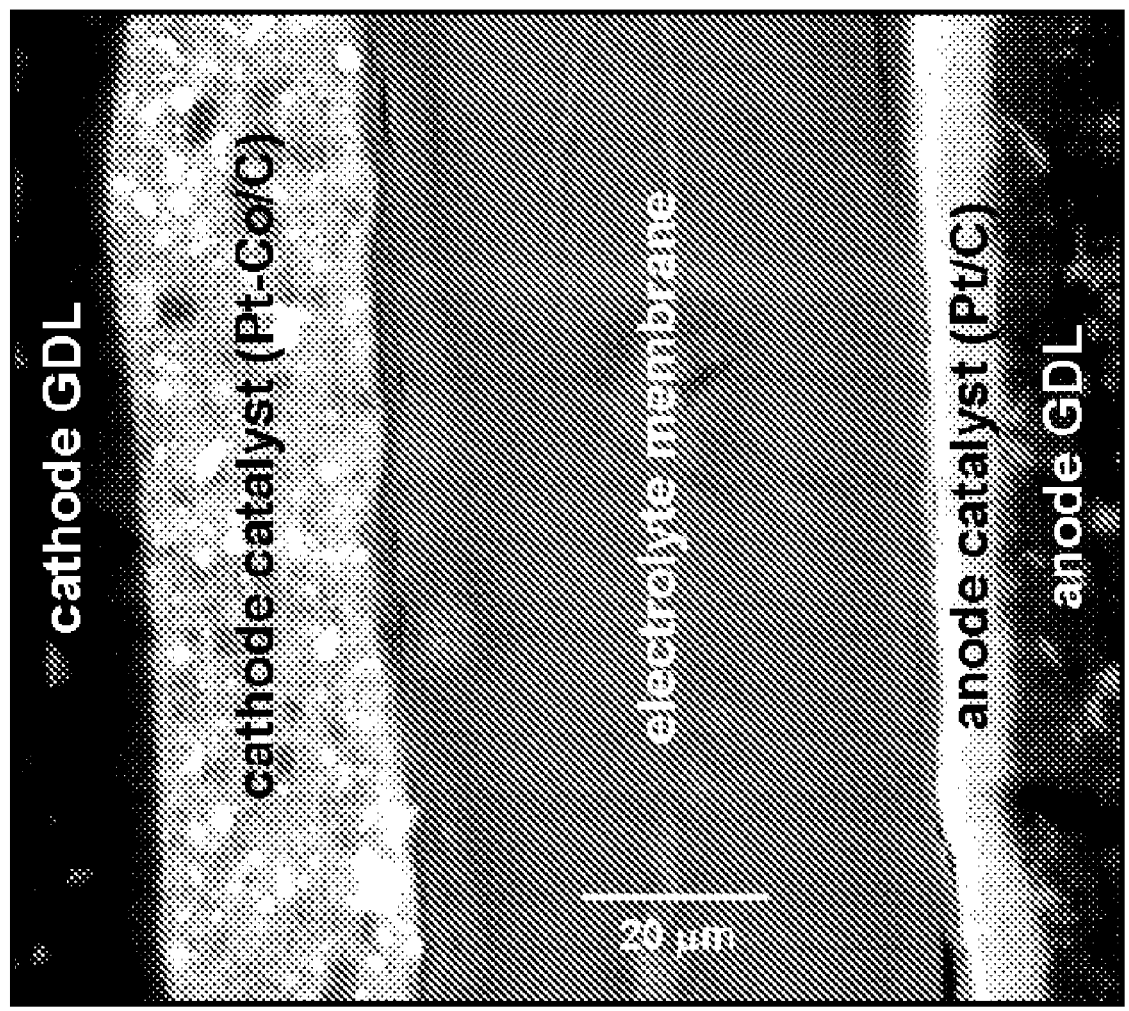
FIG. 25 illustrates (a) BSEM images obtained from the cross-sections of the fresh MEA with the Pt—Co/C catalyst developed in this study, and (b) concentration profiles of Pt and Co across the fresh MEA and the MEA subjected to 400 h of stability testing, obtained by EMPA cross-section line scan.
Figure 25B:
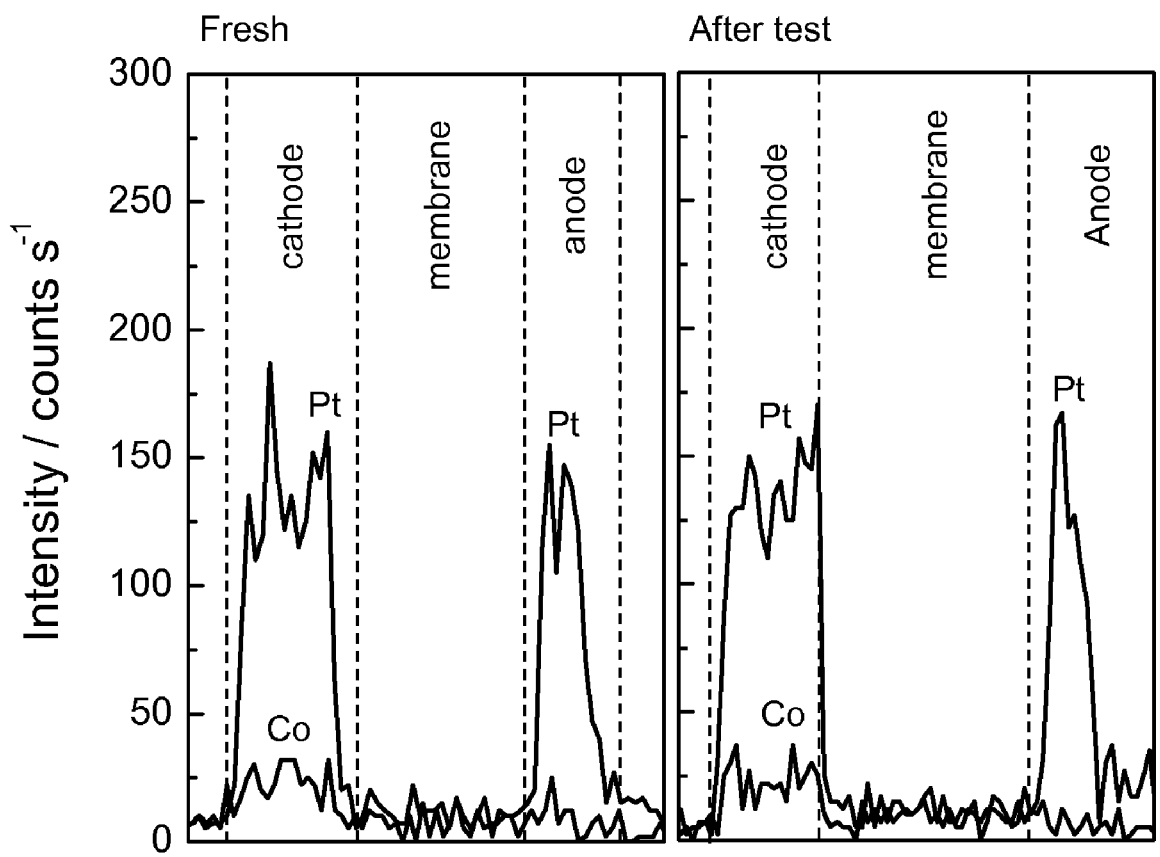

FIG. 25(a) presents the BSEM images obtained from the cross-sections of the MEA prior to stability testing. The image shows the five distinctive layers: (i) cathode GDL, (ii) cathode Pt—Co/C catalyst layer, (iii) electrolyte membrane, (iv) anode Pt/C catalyst layer, and (v) anode GDL. The thickness of the cathode Pt—Co/C catalyst layer was ca. 26 μm. FIG. 25(b) illustrates the concentration profiles of Pt and Co across the fresh MEA and the MEA subjected to stability testing for 400 h. The data were obtained by EMPA cross-section line scan combined with the BSEM. Since there is no significant signal coming from Co in the membrane in the both MEAs, the results indicate that Co remains stable in Pt—Co/C catalyst developed in accordance with the present disclosure.

The improved stability of Pt—Co/C in accordance with certain embodiments of the present disclosure is due to the following: (i) the excess Co in the alloy has been removed by leaching the catalyst in H$_2$SO$_4$ solution (only stable Co species remain in the carbon composite support); (ii) surface functional groups such as oxygen and nitrogen introduced during the preparation of the carbon composite support inhibit Co migration and dissolution; and (iii) interaction of Pt with Co/C at high temperature results in formation of a chemically and structurally stable Pt—Co/C alloy when compared with the conventional synthesis routes involving Co deposition on Pt/C.

D. Low Pt Loading Catalyst Synthesized Using the Carbon Composite Support

The Pt catalyst was synthesized on the carbon composite support using electroless Pt deposition. For comparison, the Pt catalyst supported on the conventional carbon black (Ketjen Black EC 300J) was prepared. The details of electroless Pt deposition are described in the section C-1. For MEA preparation, the cathode catalyst ink was prepared by ultrasonically blending Pt catalysts with Nafion solution, deionized water and isopropyl alcohol for 2 h. The catalyst ink was sprayed onto a gas diffusion layer (GDL). A commercially available catalyzed GDL (20 wt % Pt/C, 0.4 mg cm$^{-2}$ Pt, E-TEK) was used as the anode for all fuel cell te. Alternatively, the catalyst can be also sprayed on the membrane The anode and prepared cathode were hot-pressed with the membrane at 140° C. and at 15 atm for 3 min.

The electrochemical experiments were carried out in a single cell with serpentine flow channels. Pure hydrogen gas humidified at 77° C. and pure oxygen humidified at 75° C. were supplied to the anode and cathode compartments, respectively. All the measurements were performed at 75° C. and at ambient pressure. Polarization technique was conducted with a fully automated test station (Fuel Cell Technologies Inc.) under the constant flow mode. The hydrogen and oxygen flow rates were 150 $cm^3$ $min^{-1}$. The geometric area of the MEA was 5 $cm^2$.

Figure 26:
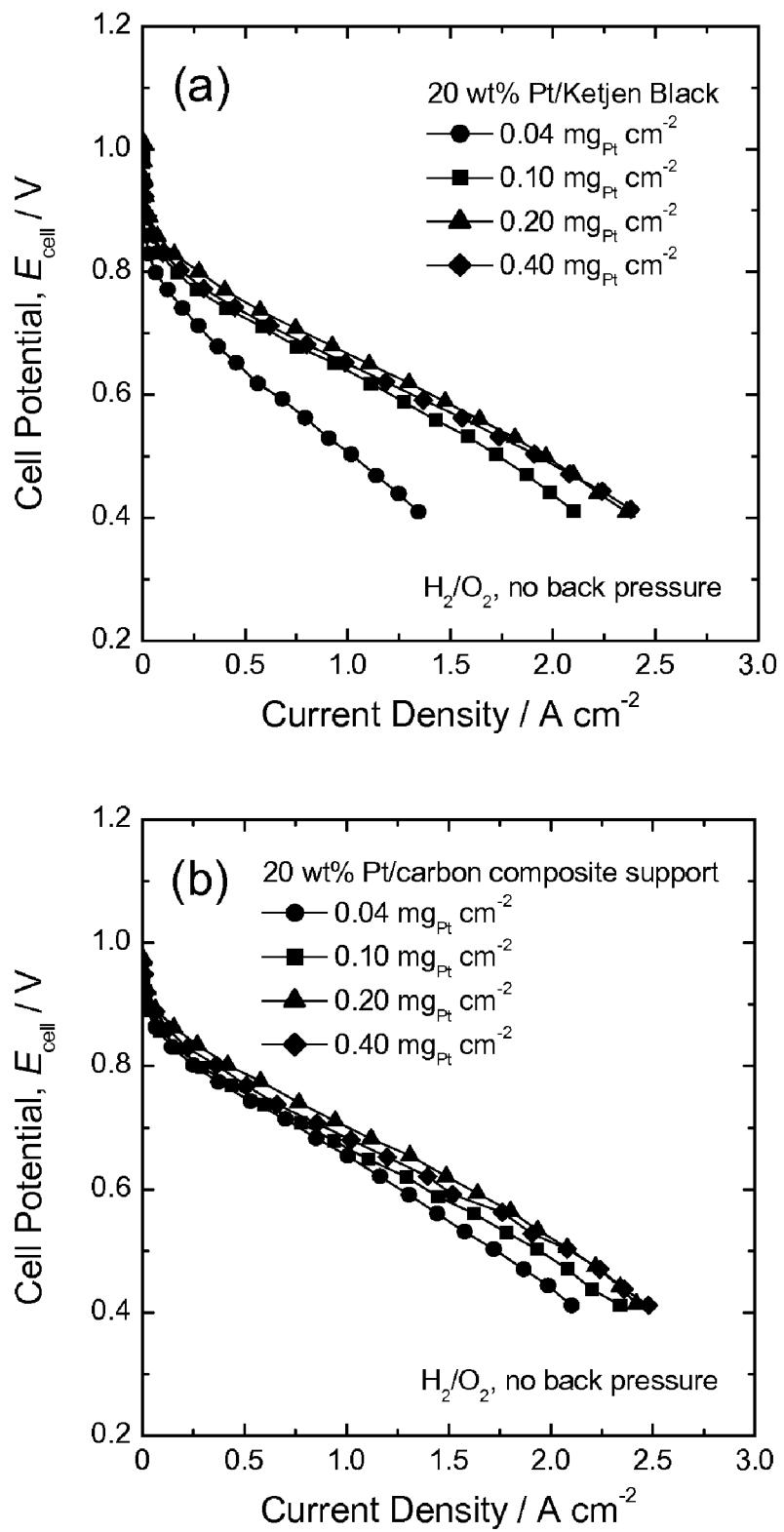
FIG. 26 illustrates polarization curves of the PEM fuel cells measured using 20 wt % Pt catalysts supported on (a) the conventional Ketjen Black and (b) a support in accordance with certain embodiments of the present disclosure. The experiments were performed at 75° C. using H$_2$ and O$_2$.
Figure 27:
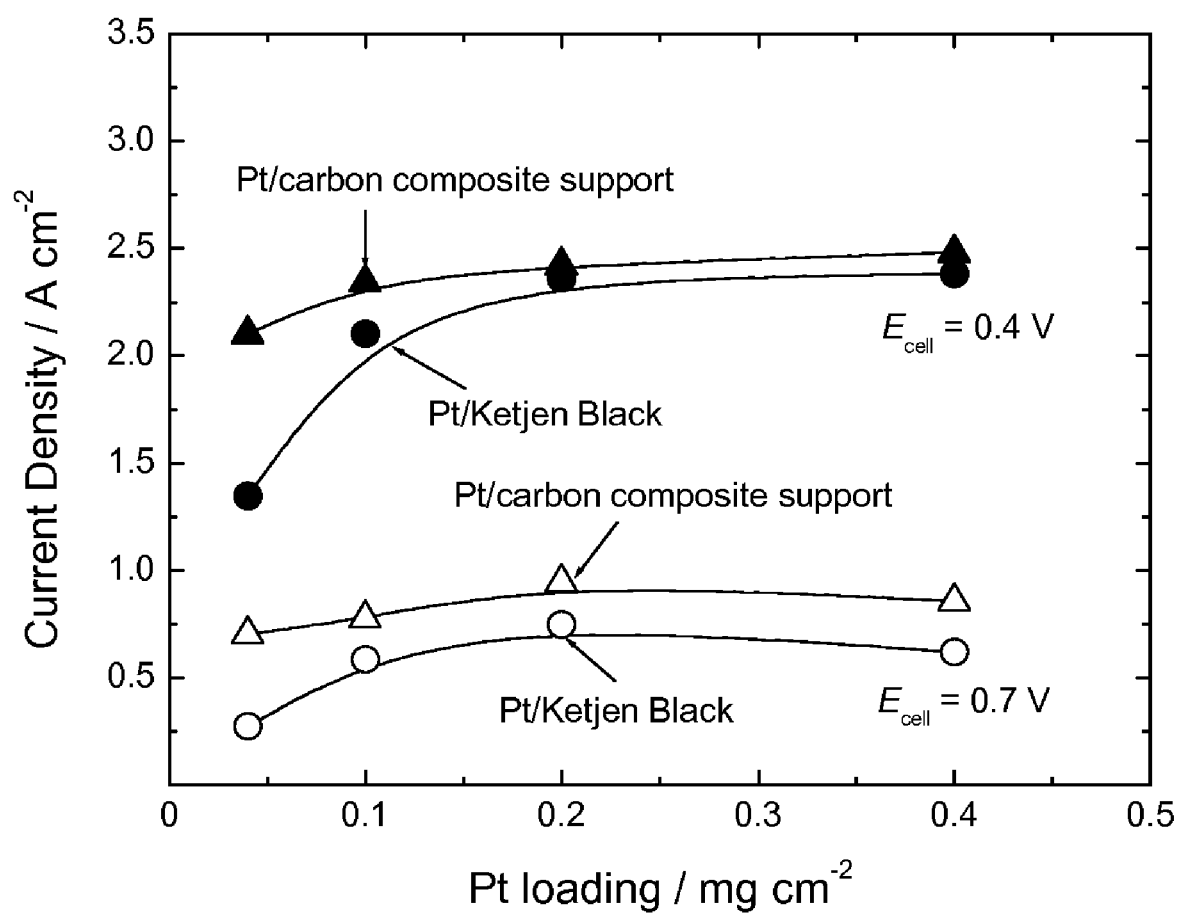
FIG. 27 illustrates current densities obtained using 20 wt % Pt catalysts supported on the conventional Ketjen Black (circle) and a support in accordance with certain embodiments of the present disclosure (triangle).

FIGS. 26($a$) and ($b$) present polarization curves of the PEM fuel cells with 20 wt % Pt cathode catalysts supported on the conventional Ketjen Black and the carbon composite support, respectively. As the Pt loading in the MEA decreases from 0.4 to 0.04 mg $cm^{-2}$, the fuel cell performance decreases gradually for both catalysts. As summarized in FIG. 27, the PEM fuel cell with Pt/carbon composite support shows a higher performance at a given Pt loading when compared with the fuel cell prepared with Pt/Ketjen Black, due to a higher activity of the carbon composite support. The performance improvement becomes remarkable at lower Pt loadings. For 0.04 mg $cm^{-2}$ loading, a current density as high as 2.1 A $cm^{-2}$ at 0.4 V was achieved for Pt/carbon composite support, in comparison to 1.34 A $cm^{-2}$ for Pt/Ketjen Black, i.e., a performance increase of over 50%.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure may be practiced by those of ordinary skill in the art, without departing from the spirit and scope of the present disclosure, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the disclosure so further described in such appended claims.

TABLE 1

The total specific surface areas, mesopore areas and micropore areas of the as-received carbon supports.

| Carbon | Area ($m^2$/g) | Micropores ($m^2$/g) | Mesopores ($m^2$/g) |
|---|---|---|---|
| Ketjen Black | 886 | 55 | 680 |
| Vulcan XC 72 | 254 | 118 | 100 |
| Black Pearl 2000 | 1500 | 720 | 540 |

TABLE 2

$H_2O_2$ percentages determined at different disk potentials for the metal-free carbon support, the as-pyrolized carbon composite catalyst, the as-leached carbon composite catalyst, and the conventional Pt/C catalyst (20 wt % Pt, E-TEK).

| | % $H_2O_2$ | | | |
|---|---|---|---|---|
| Disk potential, V vs. NHE | Metal-free carbon support | As-pyrolized carbon composite | As-leached carbon composite | Pt/C |
| 0.6 | 0 | 9.3 | 1.1 | 0.4 |
| 0.5 | 1.2 | 7.1 | 0.9 | 0.4 |
| 0.4 | 4.0 | 6.1 | 0.7 | 0.7 |

TABLE 3

Concentrations of Co and Fe in the carbon composite catalyst obtained after the chemical leaching in 0.5 M $H_2SO_4$ solution at 90° C., determined by ICP-MS and XPS.

| | Concentration (wt %) | |
|---|---|---|
| Analytical technique | Co | Fe |
| ICP-MS | 4.6 | 1.4 |
| XPS | — | — |

TABLE 5

Compositions of the leached Co/C support and the heat-treated Pt—Co/C catalyst determined by ICP-MS.

| | Concentration (wt %) | | |
|---|---|---|---|
| Sample | C | Co | Pt |
| Co/C (after leaching in $H_2SO_4$) | 97.0 | 3.0 | — |
| Pt—Co/C (after heat-treatment at 800° C.) | 80.5 | 2.7 | 16.8 |

What is claimed:

1. A process for synthesis of a catalyst comprising:
   providing a carbon precursor material;
   oxidizing the carbon precursor material whereby an oxygen functional group is introduced into the carbon precursor material; and
   adding a nitrogen functional group into the oxidized carbon precursor material.

2. The process of claim 1, wherein the carbon precursor material comprises carbon black.

3. The process of claim 1, wherein the carbon precursor material is refluxed within a solution of nitric acid in order to oxidize the carbon precursor material.

4. The process of claim 1, wherein the oxygen functional group comprises quinone, carboxyl, lactone, phenol, carbonyl, ether, pyrone, chromene, or combinations thereof.

5. The process of claim 1, wherein the nitrogen functional group is added into the oxidized carbon precursor material via a polymerization process of a nitrogen precursor donor followed by pyrolysis.

6. The process of claim 5, wherein the nitrogen precursor comprises melamine, urea, thio-urea, selenourea, or combinations thereof.

7. The process of claim 5, wherein the pyrolysis takes place at greater than about 500° C.

8. The process of claim 1, further comprising removing impurities from the carbon precursor material.

9. The process of claim 8, wherein the carbon precursor material is substantially free of metal after the impurities are removed.

10. The process of claim 1, wherein the catalyst is utilized as an electrode support for a fuel cell.

11. A process for synthesis of a catalyst comprising:
    providing a carbon precursor material;
    oxidizing the carbon precursor material whereby an oxygen functional group is introduced into the carbon precursor material;
    adding a nitrogen functional group into the oxidized carbon precursor material to form an electrode support; and
    depositing a metal-nitrogen chelate onto the electrode support.

12. The process of claim 11, wherein the carbon precursor material comprises carbon black.

13. The process of claim 11, wherein the carbon precursor material is refluxed within a solution of nitric acid in order to oxidize the carbon precursor material.

14. The process of claim 11, wherein the oxygen functional group comprises quinone, carboxyl, lactone, phenol, carbonyl, ether, pyrone, chromene, or combinations thereof.

15. The process of claim 11, wherein the nitrogen functional group is added into the oxidized carbon precursor material via a polymerization process of a nitrogen precursor donor followed by pyrolysis.

16. The process of claim 15, wherein the nitrogen precursor comprises melamine, urea, thio-urea, selenourea, or combinations thereof.

17. The process of claim 15, wherein the pyrolysis takes place at greater than about 500° C.

18. The process of claim 11, further comprising removing impurities from the carbon precursor material.

19. The process of claim 18, wherein the carbon precursor material is substantially free of metal after the impurities are removed.

20. The process of claim 18, wherein the impurities are removed by dissolving them in an acidic solution comprising hydrochloric acid or sulfuric acid.

21. The process of claim 11, wherein the metal-nitrogen chelate has a structure with the formula $MN_4$, wherein M is a metal and N is a nitrogen atom chelated with M, though the nitrogen is bonded to another molecule.

22. The process of claim 11, wherein the metal-nitrogen chelate is deposited onto the electrode support via a reflux process followed by pyrolysis.

23. The process of claim 11, wherein the support deposited with metal-nitrogen chelate further comprises a platinum catalyst, the platinum catalyst being present in an amount less than about 0.01 mg $cm^{-2}$.

24. The process of claim 11, wherein the support deposited with metal-nitrogen chelate further comprises a cobalt catalyst.

25. The process of claim 11, wherein the support deposited with metal-nitrogen chelate is utilized as a fuel cell cathode.

* * * * *